(12) United States Patent
Yamano et al.

(10) Patent No.: US 10,025,772 B2
(45) Date of Patent: Jul. 17, 2018

(54) INFORMATION PROCESSING APPARATUS, INFORMATION PROCESSING METHOD, AND PROGRAM

(71) Applicant: Sony Corporation, Tokyo (JP)

(72) Inventors: Ikuo Yamano, Tokyo (JP); Shinichi Kawano, Tokyo (JP); Tsubasa Tsukahara, Tokyo (JP); Maki Imoto, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 14/787,595

(22) PCT Filed: Apr. 21, 2014

(86) PCT No.: PCT/JP2014/002243
§ 371 (c)(1),
(2) Date: Oct. 28, 2015

(87) PCT Pub. No.: WO2014/181508
PCT Pub. Date: Nov. 13, 2014

(65) Prior Publication Data
US 2016/0110339 A1    Apr. 21, 2016

(30) Foreign Application Priority Data
May 8, 2013  (JP) ................. 2013-098444

(51) Int. Cl.
G06F 17/27    (2006.01)
G10L 15/26    (2006.01)
(Continued)

(52) U.S. Cl.
CPC .......... *G06F 17/273* (2013.01); *G06F 17/276* (2013.01); *G10L 15/26* (2013.01)

(58) Field of Classification Search
USPC ............ 704/9, 235, 251; 715/257, 261, 780; 379/88.04; 345/654, 168, 156
See application file for complete search history.

(56) References Cited

U.S. PATENT DOCUMENTS 6,092,034 A * 7/2000 McCarley ........... G06F 17/2818
704/2
6,848,080 B1    1/2005 Lee et al.
(Continued)

FOREIGN PATENT DOCUMENTS

JP    2011154590 A    8/2011
JP    2011164924 A    8/2011
(Continued)

OTHER PUBLICATIONS

International Search Report from International Publication PCT/JP2014/002243 dated Oct. 22, 2014.
(Continued)

Primary Examiner — Neeraj Sharma
(74) Attorney, Agent, or Firm — Lerner, David, Littenberg, Krumholz & Mentlik, LLP

(57) ABSTRACT

An information processing apparatus may include a control device to determine a plurality of candidate texts to correct a target text which is from an input text string, based on preceding text located at a position preceding the target text and succeeding text located at a position succeeding the target text.

13 Claims, 18 Drawing Sheets

(51) Int. Cl.

| | | |
|---|---|---|
| G10L 15/04 | (2013.01) | |
| G06F 17/28 | (2006.01) | |
| G06F 17/22 | (2006.01) | |
| G06F 3/02 | (2006.01) | |
| G09B 19/22 | (2006.01) | |
| H04M 3/42 | (2006.01) | |
| G06F 17/30 | (2006.01) | |

(56) References Cited

U.S. PATENT DOCUMENTS

| | | | | |
|---|---|---|---|---|
| 7,117,144 | B2* | 10/2006 | Goodman | G06F 17/273 704/9 |
| 7,165,019 | B1 | 1/2007 | Lee et al. | |
| 7,302,640 | B2 | 11/2007 | Lee et al. | |
| 7,424,675 | B2 | 9/2008 | Lee et al. | |
| 7,873,903 | B2* | 1/2011 | Venolia | G06F 3/0237 715/256 |
| 8,275,614 | B2* | 9/2012 | Miyamoto | G10L 15/22 379/88.04 |
| 8,447,604 | B1* | 5/2013 | Chang | H04N 9/475 434/185 |
| 8,768,950 | B2 | 7/2014 | Nakano | |
| 8,918,736 | B2* | 12/2014 | Jobs | G06F 3/0233 345/156 |
| 9,015,036 | B2 | 4/2015 | Karov Zangvil et al. | |
| 9,535,895 | B2* | 1/2017 | Gershnik | G06F 17/275 |
| 2006/0112333 | A1* | 5/2006 | Iwanaga | G06F 17/214 715/246 |
| 2008/0052073 | A1* | 2/2008 | Goto | G10L 15/06 704/251 |
| 2008/0311546 | A1* | 12/2008 | Wang | G09B 1/32 434/129 |
| 2010/0114560 | A1* | 5/2010 | Spataro | G06F 21/46 704/9 |
| 2010/0180198 | A1* | 7/2010 | Iakobashvili | G06F 17/253 715/257 |
| 2010/0286979 | A1* | 11/2010 | Zangvil | G06F 17/273 704/9 |
| 2012/0089387 | A1 | 4/2012 | Gamon et al. | |
| 2012/0297294 | A1* | 11/2012 | Scott | G06F 17/273 715/261 |
| 2013/0124492 | A1* | 5/2013 | Gao | G06F 17/273 707/706 |
| 2014/0012567 | A1* | 1/2014 | Caskey | G06F 17/273 704/9 |
| 2014/0104175 | A1* | 4/2014 | Ouyang | G06F 17/2735 345/168 |
| 2015/0220509 | A1 | 8/2015 | Karov Zangvil et al. | |
| 2016/0005150 | A1* | 1/2016 | Ghassabian | G06F 3/0488 345/654 |

FOREIGN PATENT DOCUMENTS

| | | |
|---|---|---|
| JP | 2011-203851 A | 10/2011 |
| WO | 01/35250 A2 | 5/2001 |
| WO | 2011-092691 A1 | 8/2011 |

OTHER PUBLICATIONS

Japanese Office Action for Application No. 2013098444 dated Jan. 24, 2017.

Underline ls Automatically Drawn Under Characters (Red Wavy Line, Green Wavy Line, Blue Solid Line and Purple Solid Line), Japan, Oct. 26, 2011, [online], <URL:http://web.archive.org/web/20111026175138/http://soft1.jp/trouble/o/o038.html> (Concise explanation of relevance satisfied by submission of English-language version of Japanese Office Action for Application No. 2013098444 dated Jan. 24, 2017).

\* cited by examiner

[Fig. 1]
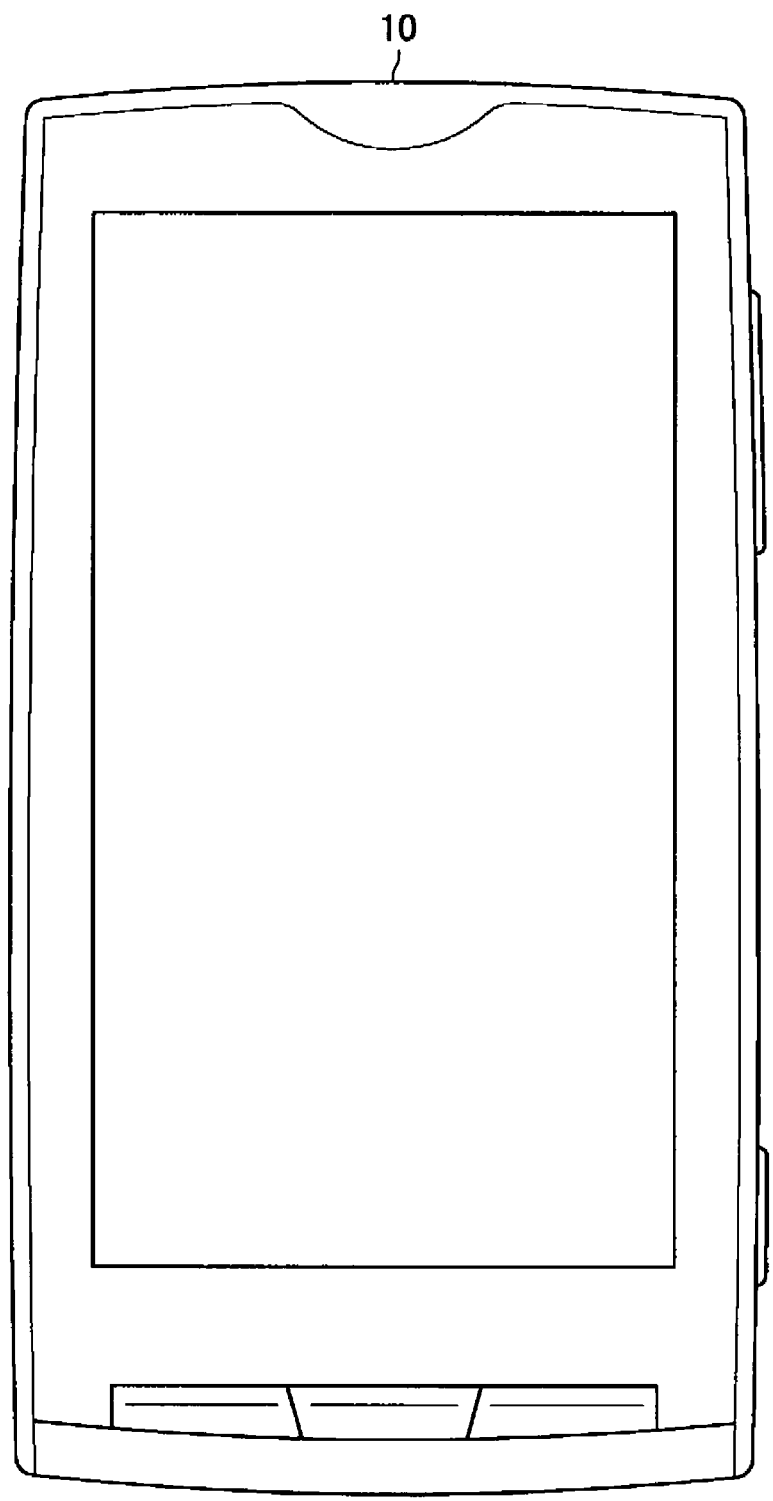

[Fig. 2]
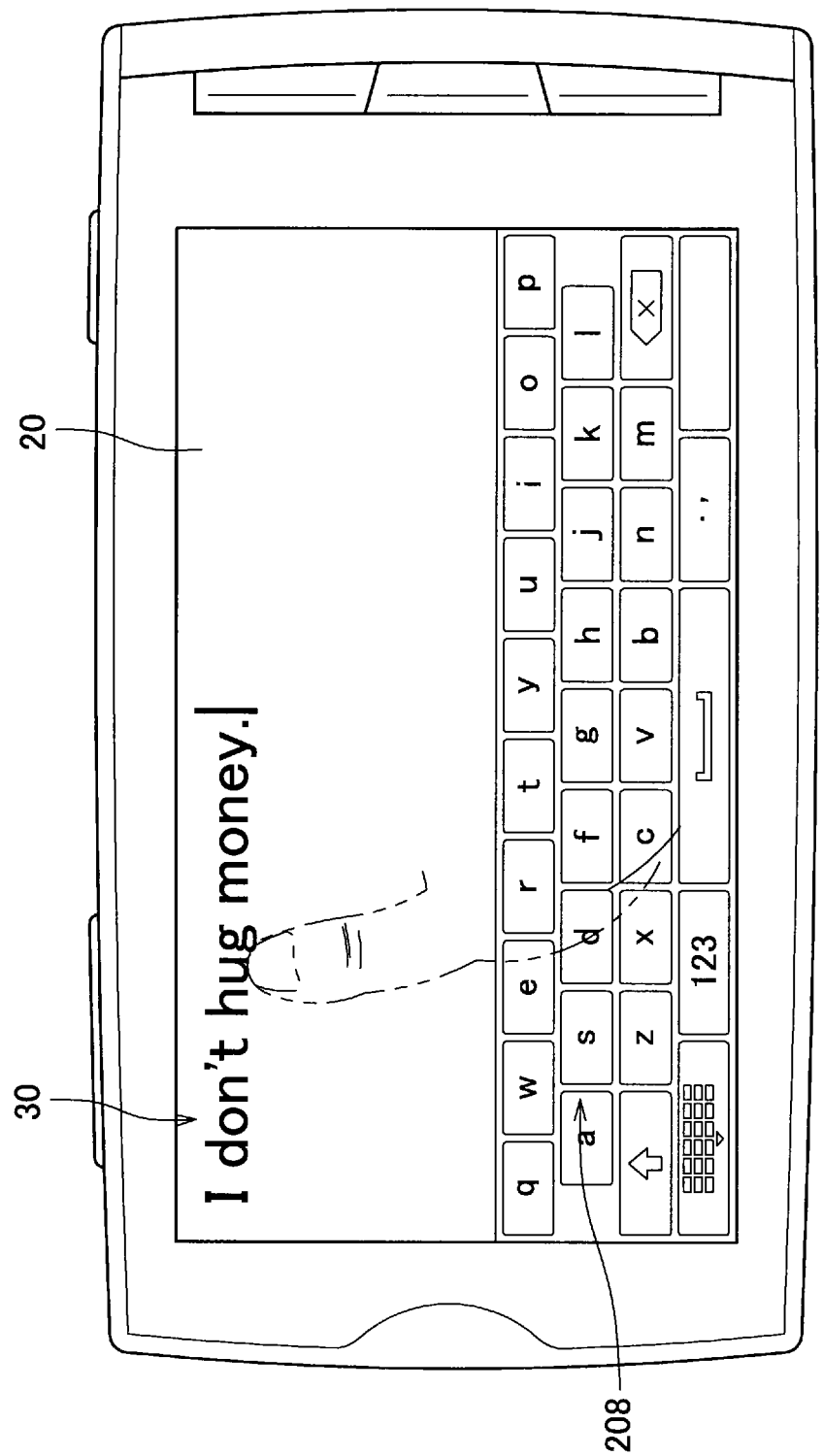

[Fig. 3]
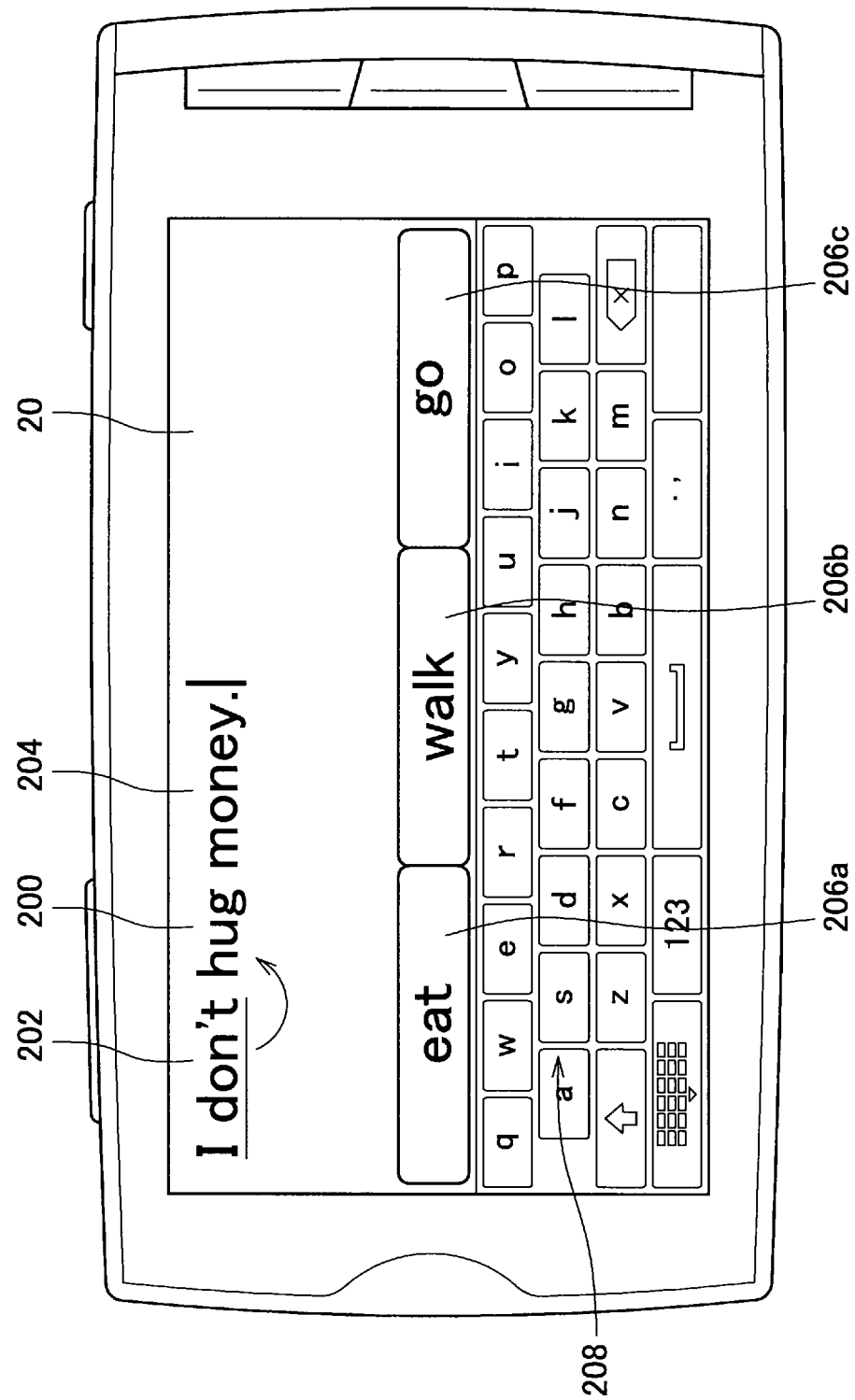

[Fig. 4]
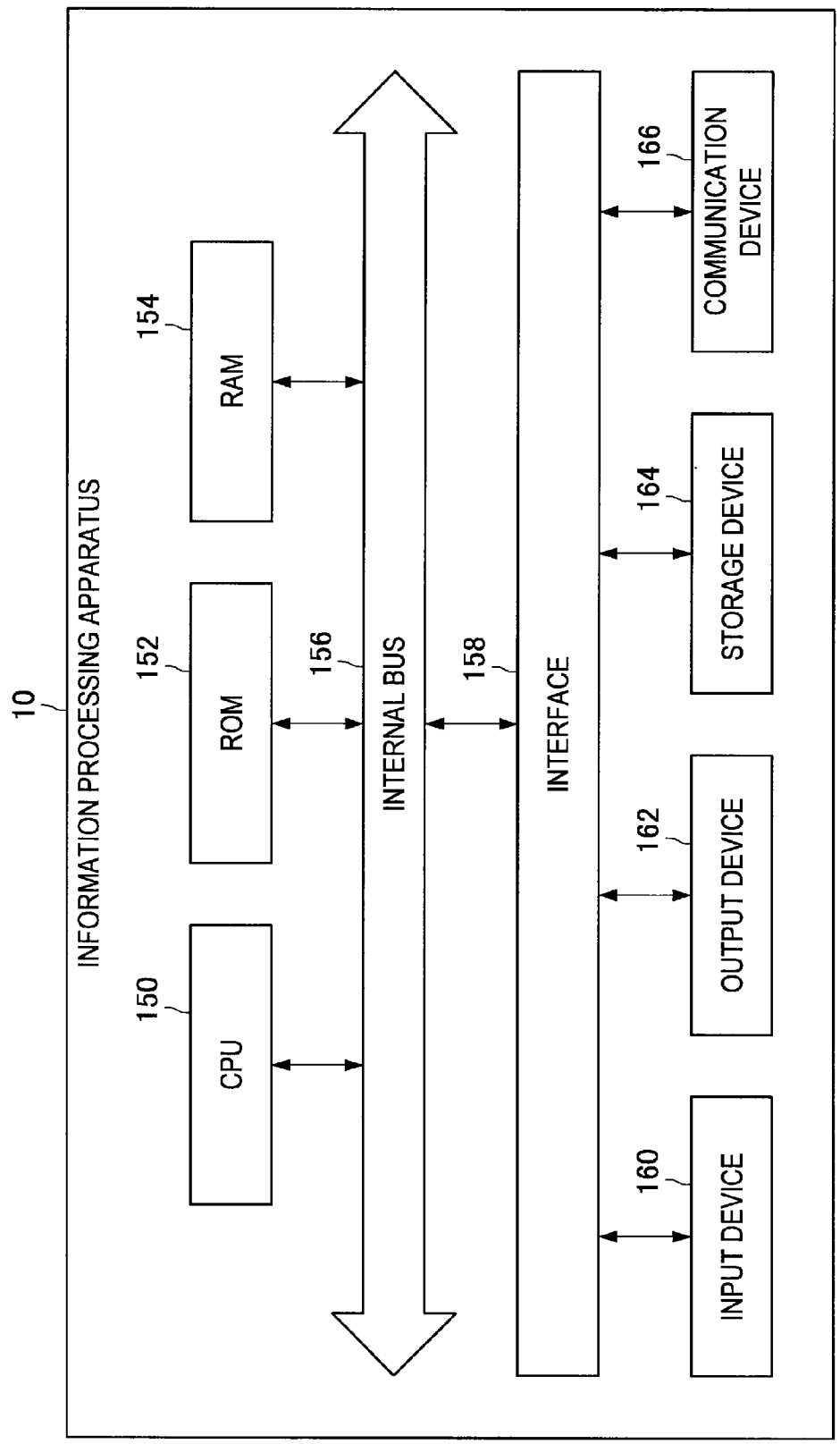

[Fig. 5]
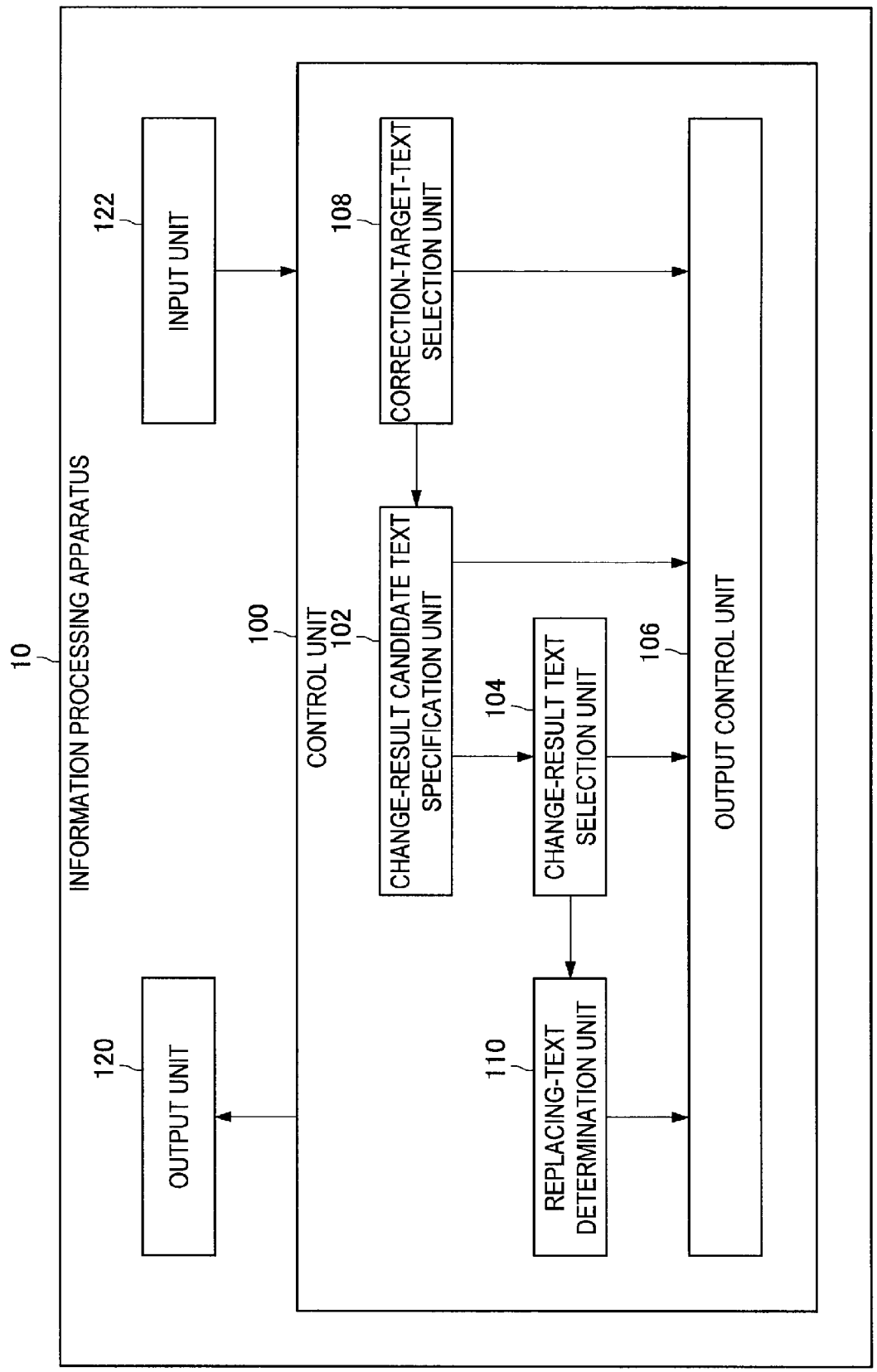

[Fig. 6]
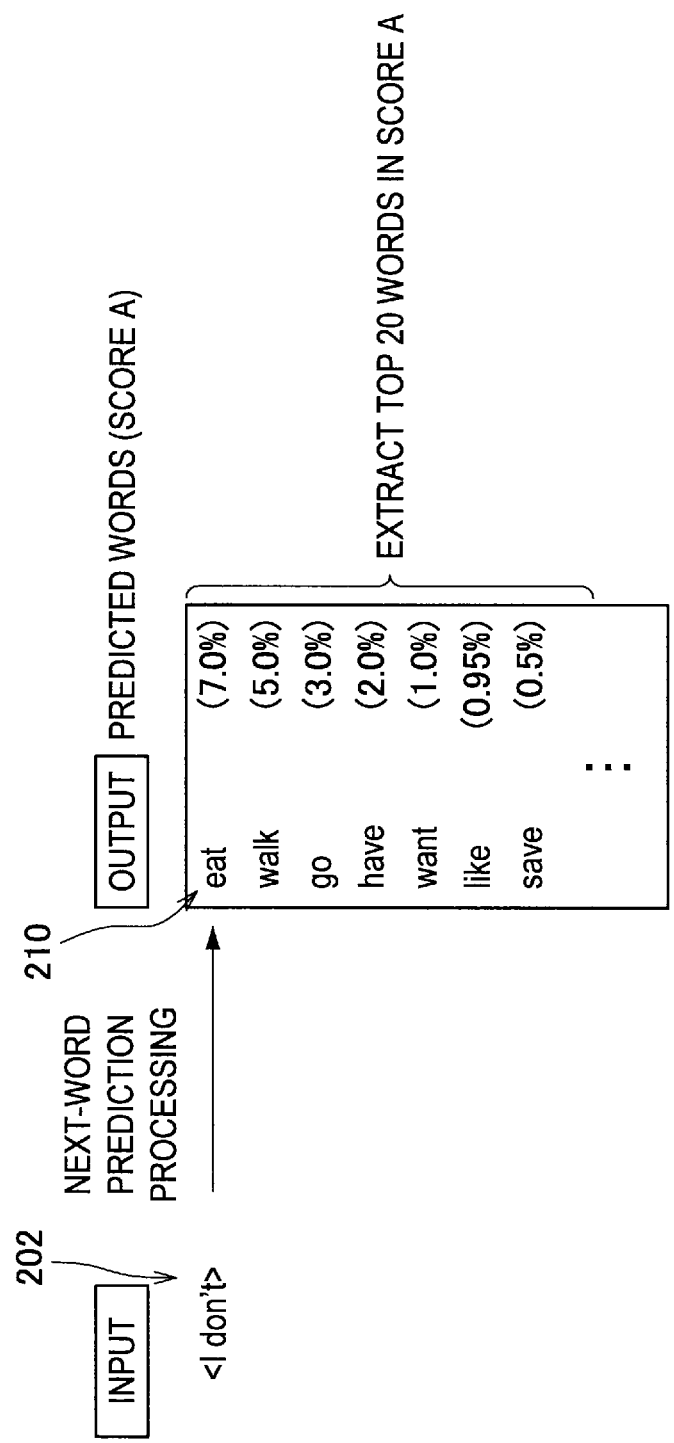

[Fig. 7]
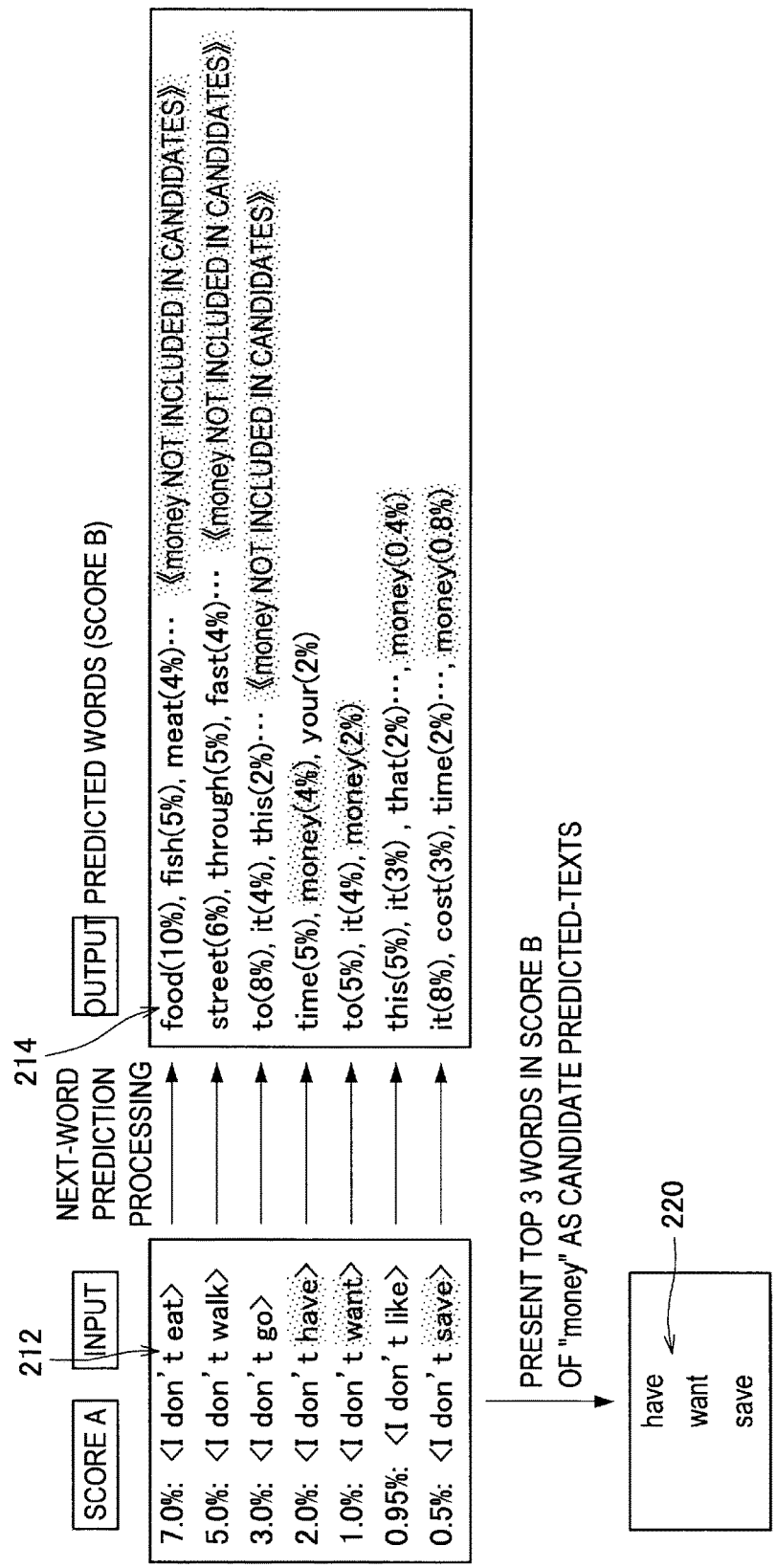

[Fig. 8]

|  | SCORE A | SCORE B | SUM | PRODUCT |
|---|---|---|---|---|
| have | 2.0% | 4.0% | 6.0% | 0.080% |
| want | 1.0% | 2.0% | 3.0% | 0.020% |
| like | 0.95% | 0.4% | 1.35% | 0.0038% |
| save | 0.5% | 0.8% | 1.3% | 0.004% |
| ... | ... | ... | ... | ... |

[Fig. 9]
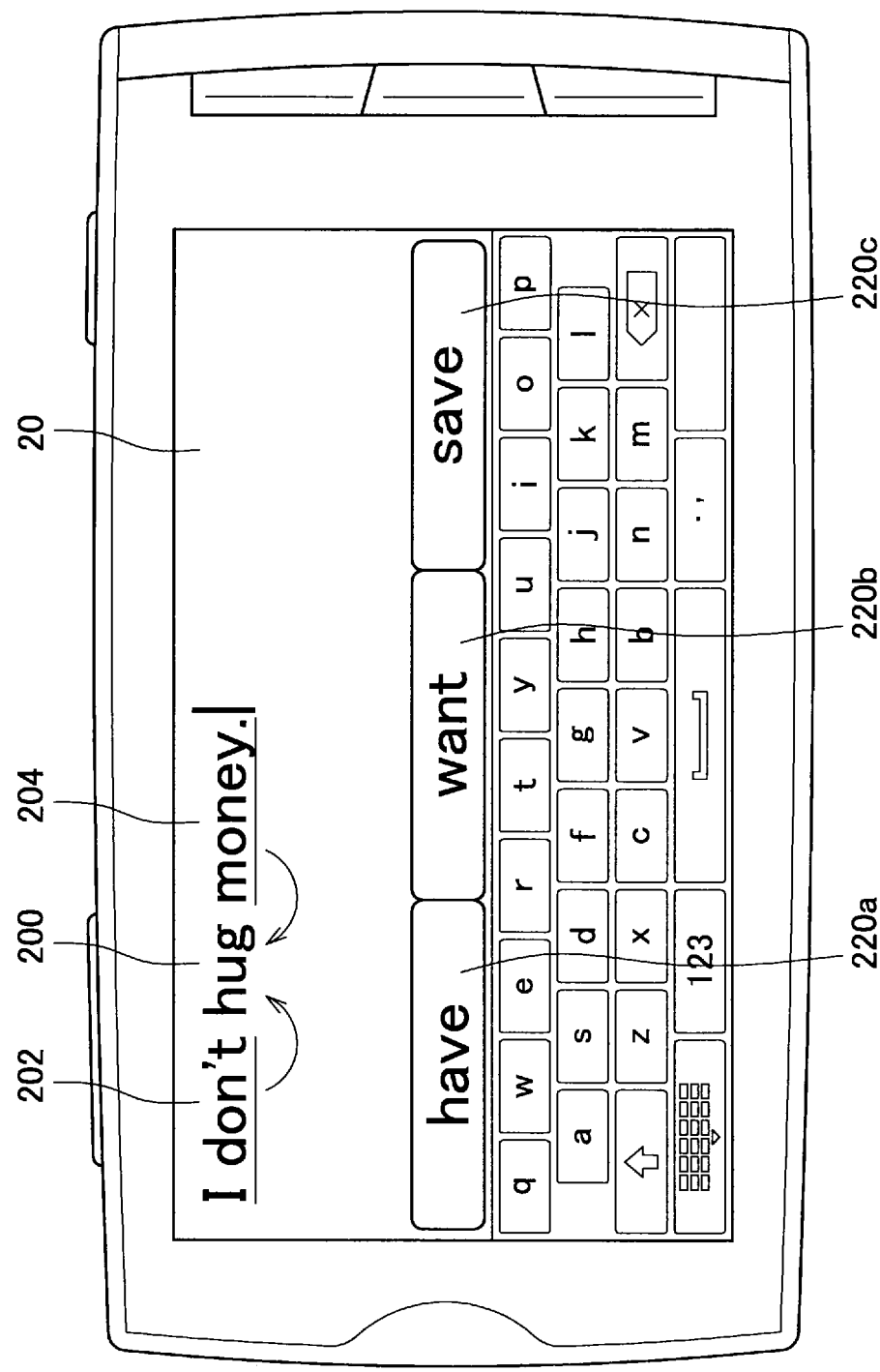

[Fig. 10]
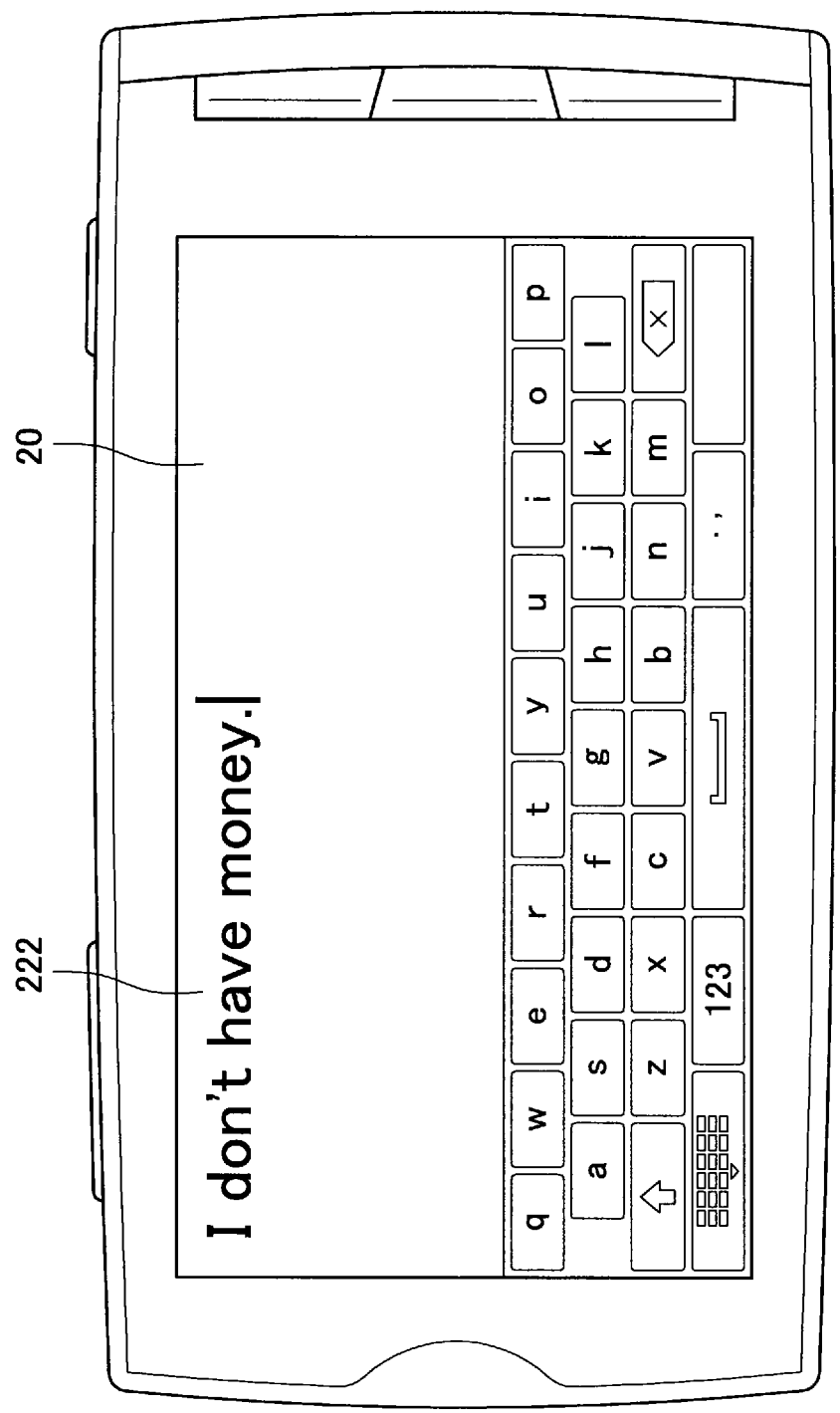

[Fig. 11]
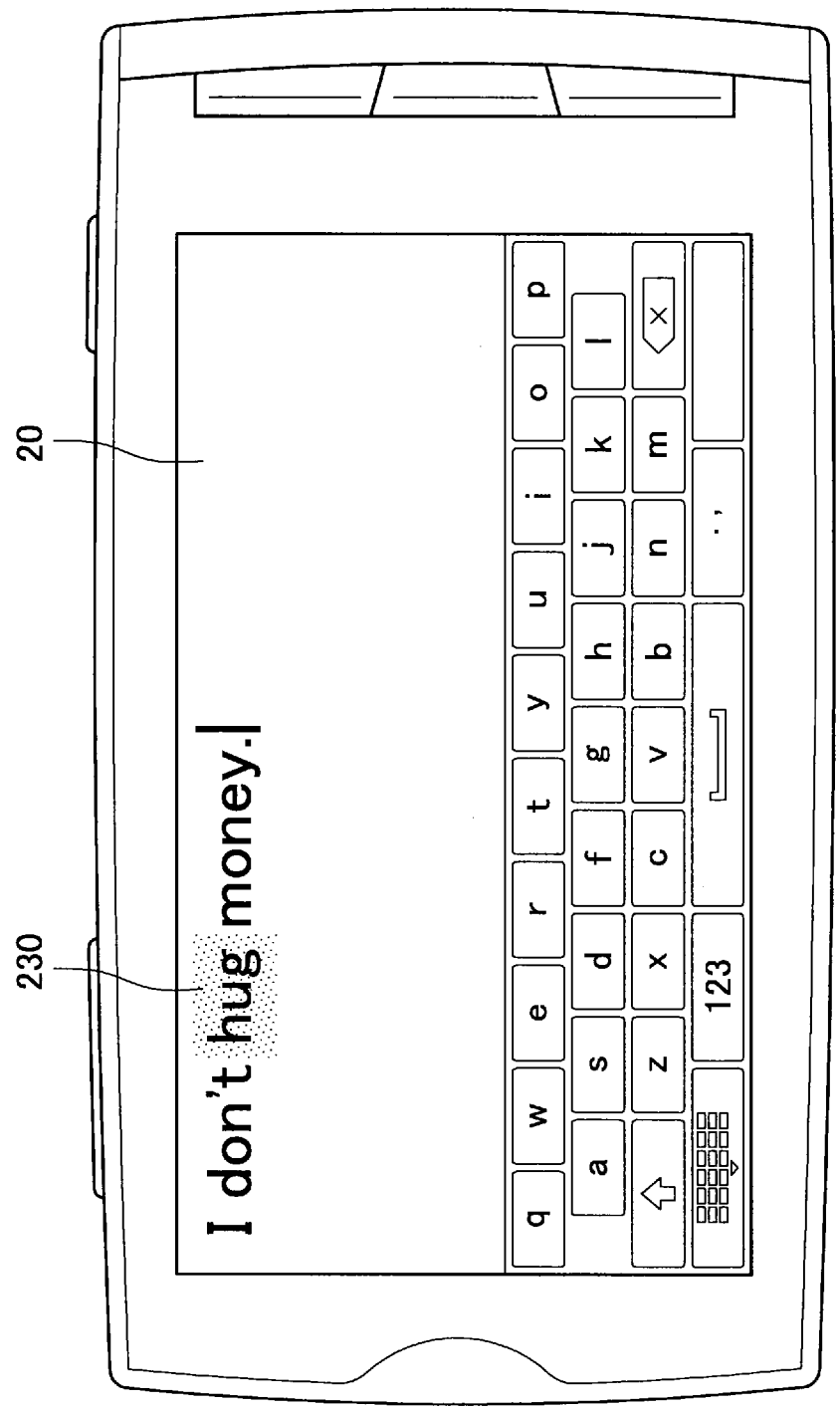

[Fig. 12]
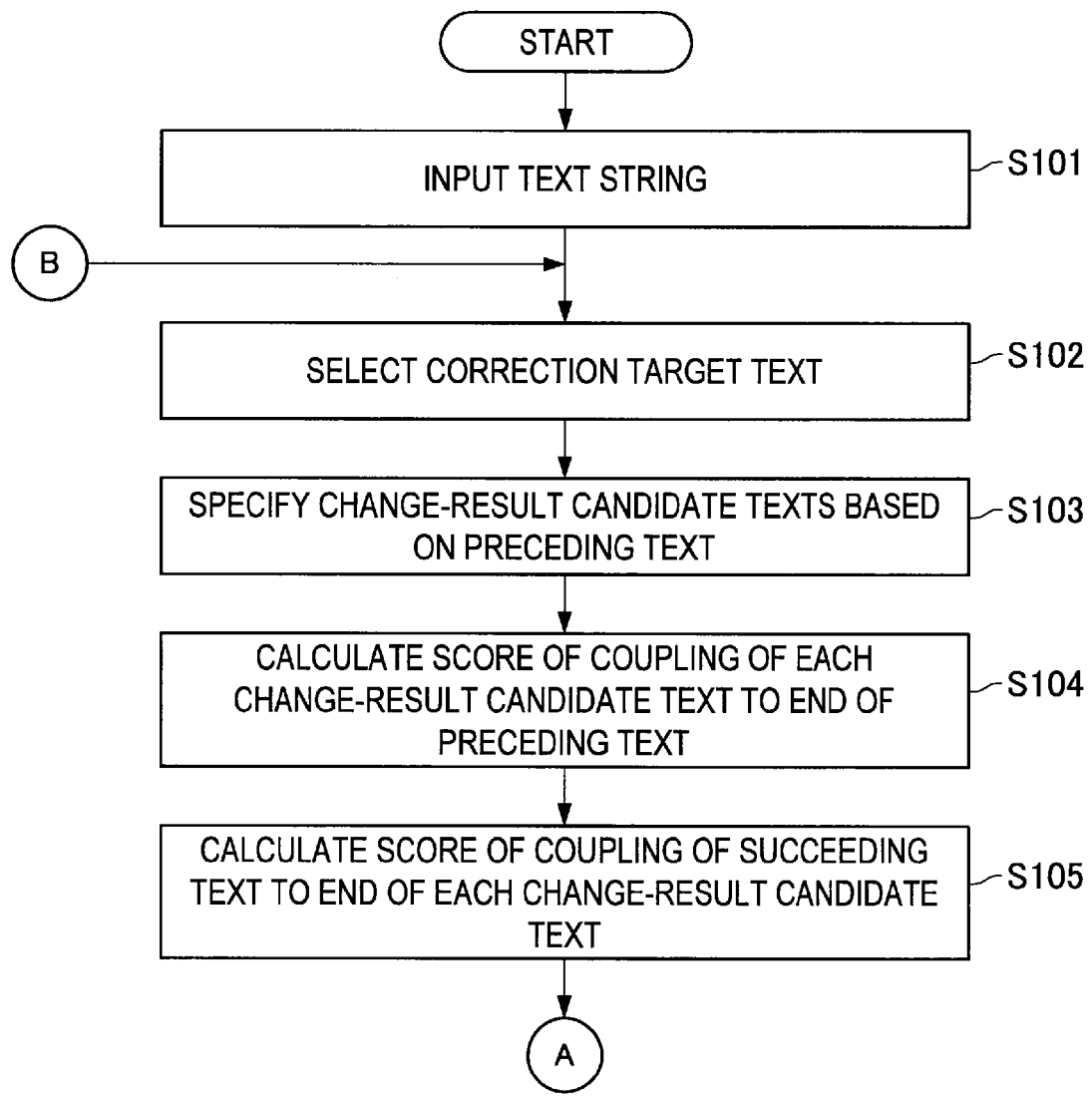

[Fig. 13]
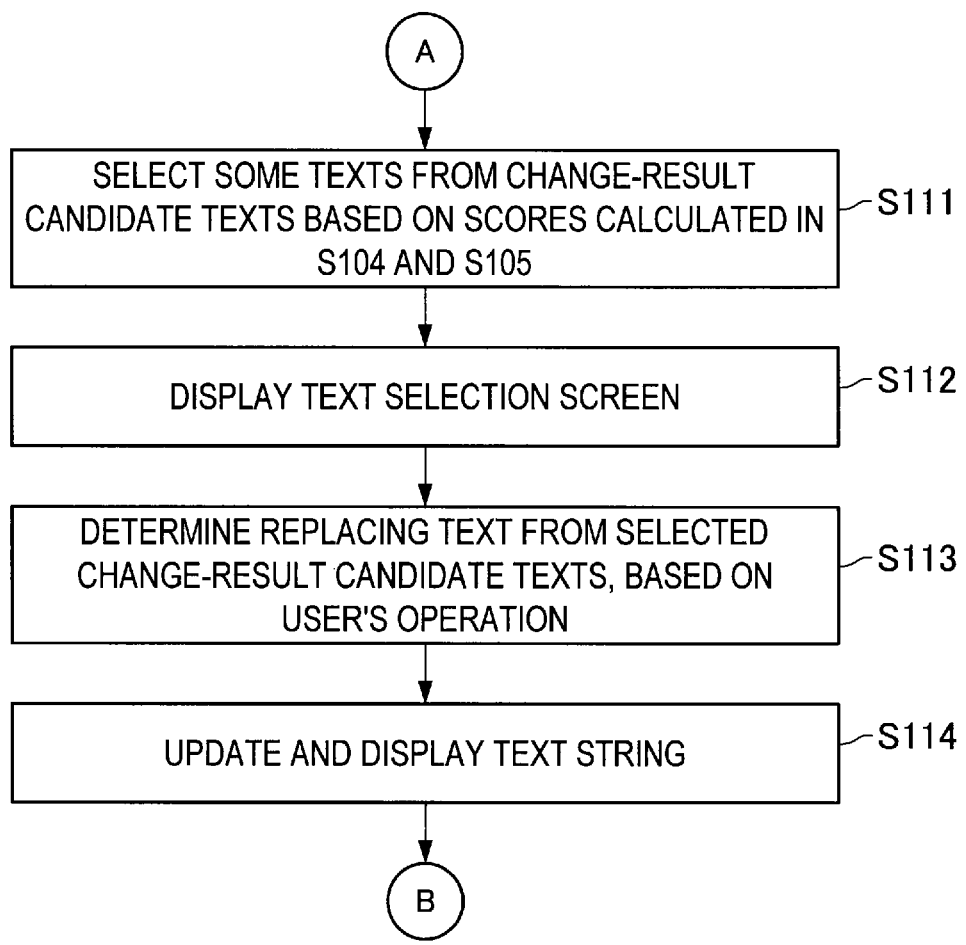

[Fig. 14]

30a → I have sons. The youngest son goes for a walk for 1 hour every day.

[Fig. 15]
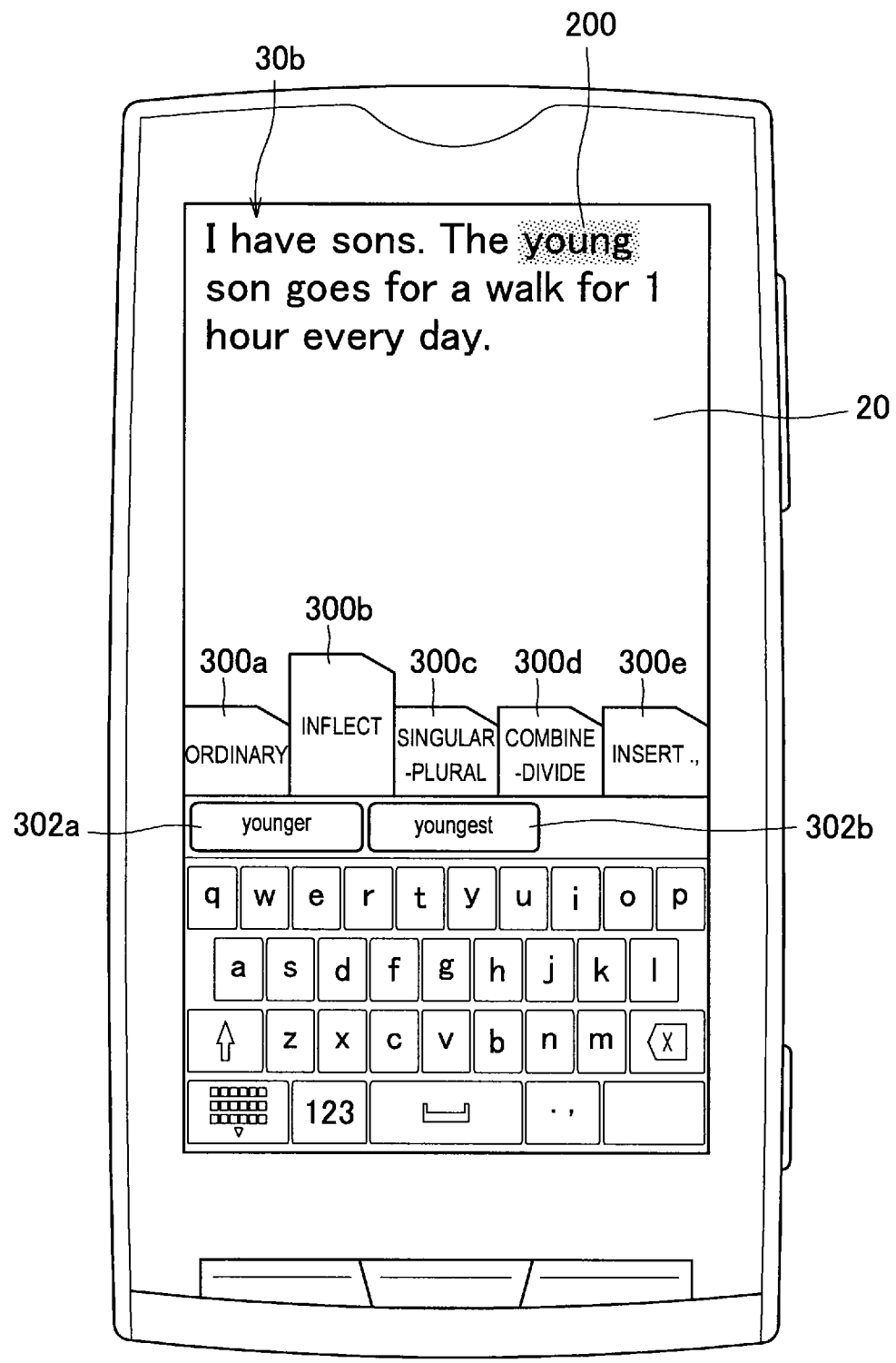

[Fig. 16]
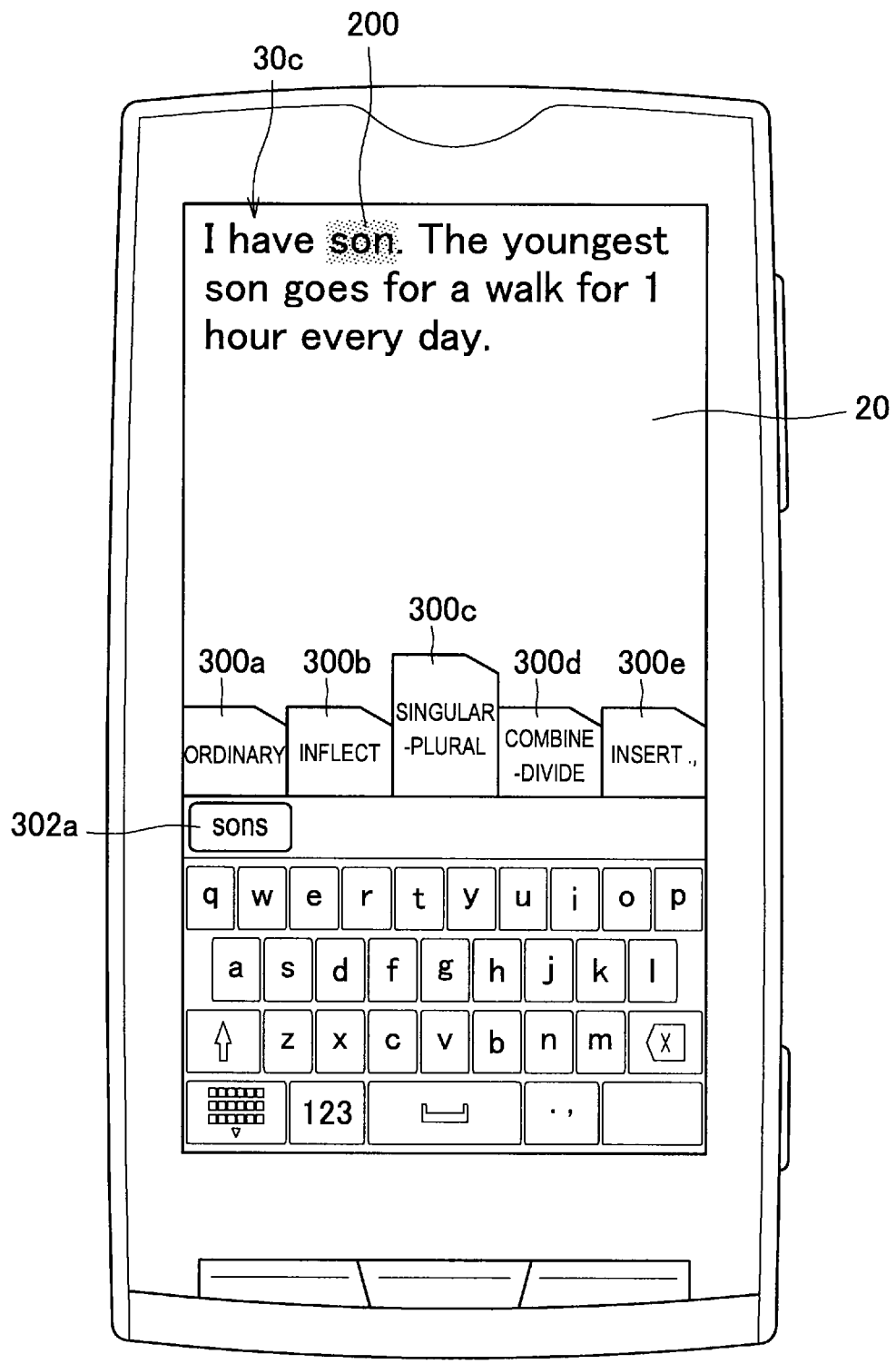

[Fig. 17]
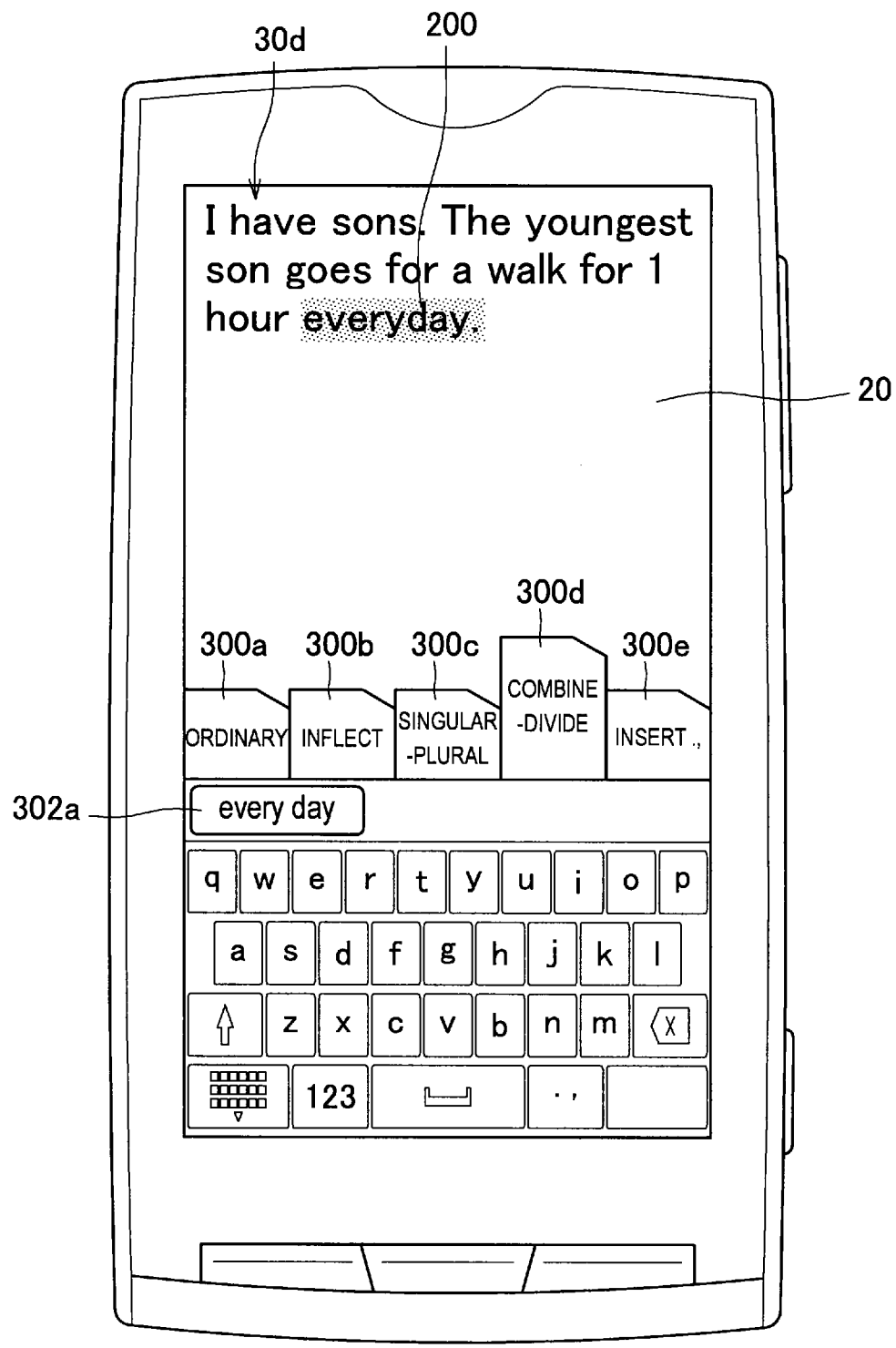

[Fig. 18]
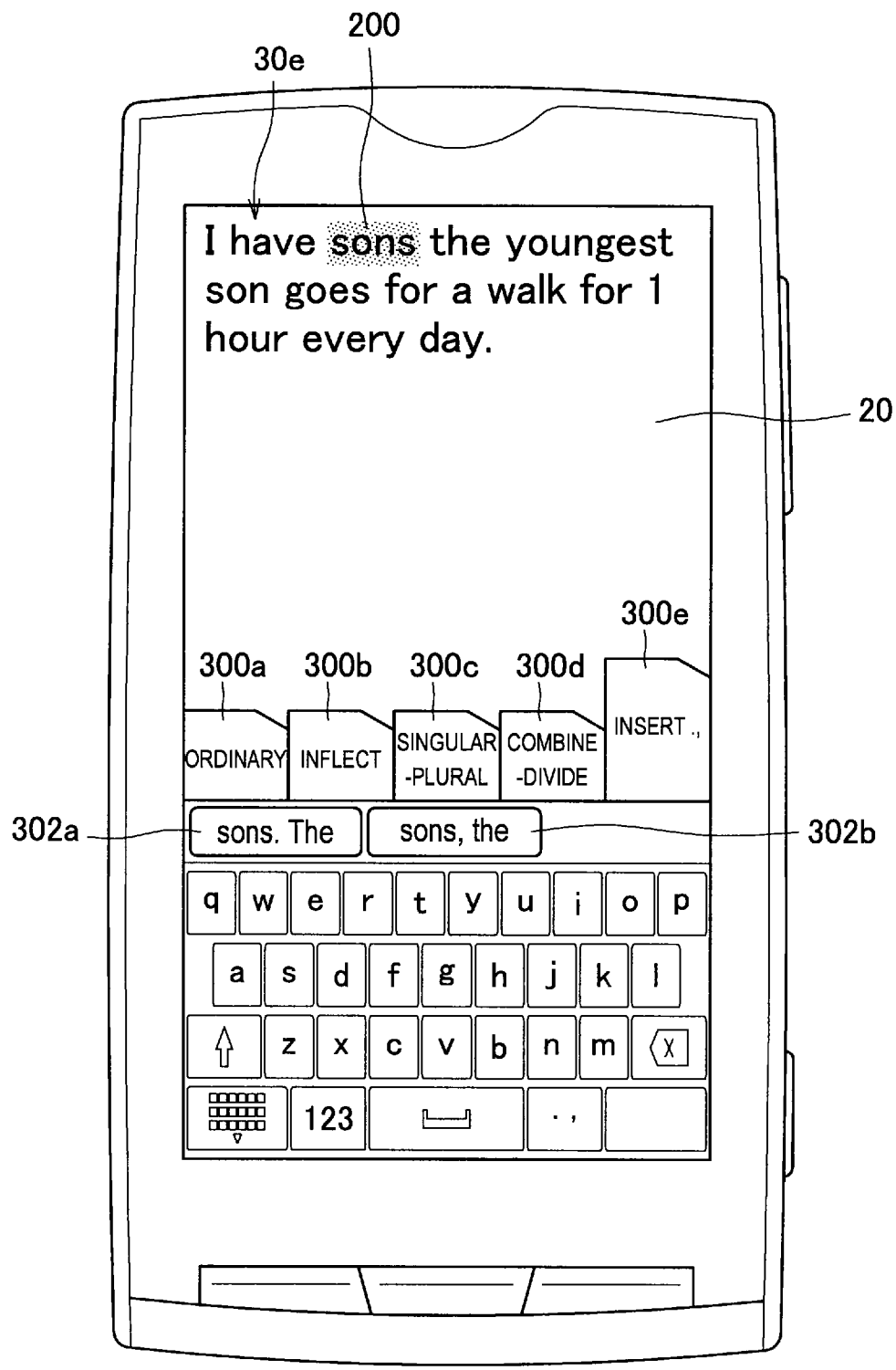

INFORMATION PROCESSING APPARATUS, INFORMATION PROCESSING METHOD, AND PROGRAM

CROSS REFERENCE TO RELATED APPLICATIONS

This application is a national phase entry under 35 U.S.C. § 371 of International Application No. PCT/JP2014/002243 filed Apr. 21, 2014, published on Nov. 13, 2014 as WO 2014/181508 A1, which claims the benefit of Japanese Priority Patent Application JP 2013-098444, filed in the Japanese Patent Office on May 8, 2013, the entire contents of which are incorporated herein by reference.

TECHNICAL FIELD

The present disclosure relates to an information processing apparatus, an information processing method, and a program.

BACKGROUND ART

A variety of information processing terminals including touch panels, such as smartphones, have been developed these days. Generally, a touch panel integrally includes a display device for displaying a display screen and an input device for user input. The touch panel also has a function of detecting a location of a user's touch with his/her finger, a specially provided pen, or the like. The user can give a processing instruction to the information processing terminal by directly touching the display screen displayed on the touch panel.

In addition, there has been developed a technology for inputting characters in a simple manner in the information processing terminal including the touch panel. For example, PTL 1 discloses the following technology. Option character strings a2 are displayed in an option character-string window W2, the option character strings a2 being registered in association with an input character a1 in an unfixed state, and one of the option character strings a2 which is selected by a user is determined as a fixed character string a4.

CITATION LIST

Patent Literature

[PTL 1]
JP 2011-203851A

SUMMARY

Technical Problem

However, the aforementioned technique does not enable the user to correct a text string efficiently. For example, it is necessary for the user to once delete a correction target text from an inputted text string and thereafter to input a new text, thus it takes a long time to correct the text string.

In light of the foregoing, it is desirable to provide an information processing apparatus, an information processing method, and a program which are novel and improved, and which enable a user to correct a text string more efficiently.

Solution to Problem

According to an embodiment of the present disclosure, an information processing apparatus may include a control device to determine a plurality of candidate texts to correct a target text which is from an input text string, based on preceding text located at a position preceding the target text and succeeding text located at a position succeeding the target text.

According to an embodiment of the present disclosure, an information processing method may include determining, by a control device, a plurality of candidate texts to correct a target text which is from an input text string, based on preceding text located at a position preceding the target text and succeeding text located at a position succeeding the target text.

According to an embodiment of the present disclosure, a non-transitory recording medium may be recorded with a program executable by a computer, and the program may include determining a plurality of candidate texts to correct a target text which is from an input text string, based on preceding text located at a position preceding the target text and succeeding text located at a position succeeding the target text.

According to an embodiment of the present disclosure, an information processing system may include at least two devices having communication capability of:
an eye-glass device, a mobile phone device, and a server device; and a control device. The control device may include a plurality of components, in which at least one of the components is included in each of the at least two devices, wherein the components in the at least two devices are operable to jointly determine a plurality of candidate texts to correct a target text which is from an input text string, based on preceding text located at a position preceding the target text and succeeding text located at a position succeeding the target text.

Advantageous Effects of Invention

According to the embodiments of the present disclosure described above, the user can correct the text string more efficiently.

BRIEF DESCRIPTION OF DRAWINGS

FIG. 1 is an outline diagram of an information processing apparatus 10 according to an embodiment of the present disclosure.

FIG. 2 is an explanatory diagram illustrating an example where a user selects a correction target text in the embodiment.

FIG. 3 is an explanatory diagram illustrating an example of displaying change-result candidate texts according to a comparative example of the present disclosure.

FIG. 4 is an explanatory diagram illustrating a hardware configuration of the information processing apparatus 10 according to the embodiment.

FIG. 5 is a functional block diagram illustrating a configuration of the information processing apparatus 10 according to the embodiment.

FIG. 6 is an explanatory diagram illustrating an example of specifying change-result candidate texts according to the embodiment.

FIG. 7 is an explanatory diagram illustrating an example of selecting change-result candidate texts according to the embodiment.

FIG. 8 is an explanatory diagram illustrating examples of scores of the change-result candidate texts according to the embodiment.

FIG. 9 is an explanatory diagram illustrating an example of displaying the change-result candidate texts according to the embodiment.

FIG. 10 is an explanatory diagram illustrating an example of displaying replacement with one of the change-result candidate texts according to the embodiment.

FIG. 11 is an explanatory diagram illustrating an example of displaying an automatically extracted correction target text according to the embodiment.

FIG. 12 is an explanatory diagram illustrating part of an example of an operation according to the embodiment.

FIG. 13 is an explanatory diagram illustrating part of an example of an operation according to the embodiment.

FIG. 14 is an explanatory diagram illustrating an example of an input text string.

FIG. 15 is an explanatory diagram illustrating an example of display according to a modification of the present disclosure.

FIG. 16 is an explanatory diagram illustrating an example of display according to a modification of the present disclosure.

FIG. 17 is an explanatory diagram illustrating an example of display according to a modification of the present disclosure.

FIG. 18 is an explanatory diagram illustrating an example of display according to a modification of the present disclosure.

DESCRIPTION OF EMBODIMENTS

Hereinafter, preferred embodiments of the present disclosure will be described in detail with reference to the appended drawings. Note that, the preferred embodiments can be implemented in various modes as described in detail in "2. Detailed Description of Embodiment of Present Disclosure" taken as an example. A description is given of "Description of Embodiments" in the order of the headings shown below.
1. Basic Configuration of Information Processing Apparatus
1-1. Outline
1-2. Comparative Examples of Present Disclosure
1-3. Hardware Configuration
2. Detailed Description of Embodiment of Present Disclosure
2-1. Configuration
2-2. Operation
2-3. Advantageous Effects
3. Modifications Note that, in this specification and the appended drawings, structural elements that have substantially the same function and structure are denoted with the same reference numerals, and repeated explanation of these structural elements is omitted.

In addition, in this specification and the appended drawings, a plurality of structural elements that have substantially the same function and structure might be denoted with the same reference numerals suffixed with different letters or numbers to be discriminated from each other as necessary, like a change-result candidate text 220*a* and a change-result candidate text 220*b*. However, when not having to be particularly discriminated from each other, the plurality of structural elements that have substantially the same function and structure are only denoted with the same reference numerals. For example, when not having to be particularly discriminated from each other, the change-result candidate text 220*a* and the change-result candidate text 220*b* are simply referred to as the change-result candidate texts 220.

1. Basic Configuration of Information Processing Apparatus

1-1. Outline

Firstly, a basic configuration of an information processing apparatus 10 according to an embodiment of the present disclosure will be described with reference to FIG. 1. As illustrated in FIG. 1, the information processing apparatus 10 is an information processing terminal including a display. The information processing apparatus 10 may be, for example, a mobile phone such as a smartphone, a tablet terminal, a PDA (Personal Digital Assistant), a TV receiver, a digital camera, an eye-glass computer, a watch, a game machine, or the like.

The information processing apparatus 10 can display a display screen 20 including a text string 30 as illustrated in FIG. 2, for example. In addition, the information processing apparatus 10 includes a touch panel device and can detect a location where a user of the information processing apparatus 10 touches the display screen 20 with his/her finger.

The information processing apparatus 10 can also implement software for editing text such as a memorandum and software for displaying a software keyboard on the display screen 20. For example, the user can freely input or edit text strings by using the software keyboard displayed on the display screen 20.

The information processing apparatus 10 can also have a candidate predicted-text presentation function which predicts, from an already inputted text string, a text the user intends to input. This candidate predicted-text presentation function predicts a text succeeding the already inputted text or a character string succeeding a cursor location in a text being currently inputted, and displays the predicted text or the character string on the display screen 20, the prediction being performed based on, for example, a history of texts inputted by the user or a database including general sentence expressions recorded therein. For example, at a time point when the user inputs two letters which are "h" and "e", the candidate predicted-text presentation function predicts and presents a text which is "hello". Alternatively, at a time point when the user inputs "good", the candidate predicted-text presentation function predicts and presents a text such as "morning" or "bye" as a candidate of a succeeding text.

The information processing apparatus 10 can also have a function of recognizing speech sound collected, for example, by a microphone provided to the information processing apparatus 10. Further, the information processing apparatus 10 can also convert the recognized speech sound into a text string and thereafter can display the text string on the display screen 20. Note that the information processing apparatus 10 can also recognize sound speech based on electronic data having the sound speech recorded therein and can convert the sound speech into a text string.

1-2. Comparative Examples of Present Disclosure

Meanwhile, when the user inputs a text by using the speech recognition function, the software keyboard, or the like, the text might be wrongly inputted due to a recognition error in the speech recognition, a typing error by the user, or the like. Even when the text is correctly inputted, the user might wish to correct part of a text string after the input. For this reason, it is desirable that the user be able to correct the inputted text string easily.

1-2-1. First Comparative Example

In the case where the user wishes to correct a text string, a conceivable way as a first comparative example according to the present disclosure is that the user firstly deletes a correction target text from the text string and then inputs a new text. However, a lot of manual work by the user is necessary in the first comparative example, thus leading to low convenience and a long time for the correction.

1-2-2. Second Comparative Example

A conceivable way as a second comparative example is a correction system in which: a text highly likely to have a grammatical input mistake in an inputted text string is presented to the user, for example, by being underlined; and further, translation candidates for the word are presented. For example, when the user inputs "This are books.", the correction system displays an underlined part "This are" where a grammatical mistake is made, on the display screen. When the user selects a part "This", for example, by placing the cursor and right-clicking on the part, a corrected-text candidate which is "These" is displayed in a context menu.

However, the second comparative example is a system for correcting merely a grammatical mistake, and thus the types of correctable mistakes are limited. Suppose a case as an example where the user utters "I don't have money." and where the speech recognition function wrongly recognizes the speech as "I don't hug money.". In this case, the expression "hug money" is unnatural in a context, and thus should be a correction target. However, the expression does not have a grammatical mistake. Thus, there arises a difficulty that the expression is not judged as a correction target in the second comparative example.

1-2-3. Third Comparative Example

A conceivable way as a third comparative example is that corrected-text candidates for an inputted text are presented by using the candidate predicted-text presentation function. In the third comparative example, a plurality of texts which are corrected candidates for the correction target text selected by the user are presented based on a text located at a position preceding the correction target text. For example, as illustrated in FIG. 3, when the user selects a word "hug" as a correction target text on the display screen 20, texts as corrected-text candidates such as "eat" are presented based on a text "I don't" located at the position preceding the word "hug".

However, in the third comparative example, a text located at a position succeeding the correction target text is not used as a keyword for prediction, words unlikely to collocate with "money", such as "eat", "walk", and "go", are presented as the corrected-text candidates as illustrated in FIG. 3. For this reason, it is not possible for the user to correct the text string as intended.

As described above, it is not possible for the user to correct a text string efficiently in any of the first to third comparative examples.

Hence, the information processing apparatus 10 according to an embodiment of the present disclosure has been created, with the circumstances described above being focused on. The information processing apparatus 10 according to the embodiment of the present disclosure enables the user to correct a text string more efficiently. Hereinafter, such an embodiment according to the present disclosure will be described in detail.

1-3. Hardware Configuration

Note that the information processing apparatus 10 has a hardware configuration as illustrated in FIG. 4, for example. As illustrated in FIG. 4, the information processing apparatus 10 includes a CPU (Central Processing Unit) 150, a ROM (Read Only Memory) 152, a RAM (Random Access Memory) 154, an internal bus 156, an interface 158, an input device 160, an output device 162, a storage device 164, and a communication device 166.

The CPU 150 is configured as an example of a control unit 100 to be described later. The CPU 150 functions as an arithmetic processing unit and a controller device, and controls overall operations in the information processing apparatus 10 according to various programs. The CPU 150 may be a microprocessor.

The ROM 152 stores therein programs and operational parameters which are used by the CPU 150. The RAM 154 temporarily stores therein the programs used and executed by the CPU 150, parameters appropriately varying in executing the programs, and the like. The CPU 150, the ROM 152, and the RAM 154 are connected to each other via the internal bus 156 configured of a CPU bus or the like.

The interface 158 connects the input device 160, the output device 162, the storage device 164, and the communication device 166 with the internal bus 156. For example, the input device 160 exchanges data with the CPU 150 and the like through the interface 158 and the internal bus 156.

The input device 160 is configured as an example of an input unit 122 to be described later. The input device 160 includes: input means used by the user for imputing information, such as a touch panel, a button, a microphone, or a switch; an input control circuit configured to generate an input signal based on user input and to output the signal to the CPU 150; and the like. By operating the input device 160, the user can input various data into the information processing apparatus 10 and instruct the information processing apparatus 10 to perform a processing operation.

The output device 162 is configured as an example of an output unit 120 to be described later. The output device 162 includes a display device such as a liquid crystal display (LCD: Liquid Crystal Display) device, an OLED (Organic Light Emitting Diode) device, or a lamp. Further, the output device 162 includes a sound output device such as a speaker. For example, the display device displays a captured image, a generated image, and the like. In contrast, the sound output device outputs sound converted from sound data or the like.

The storage device 164 is a device for data storage, such as a hard disk. The storage device 164 may include a storage medium, a recording device which records data in a storage medium, a reader device which reads data from a storage medium, a deletion device which deletes data recorded in a storage medium, and the like. The storage device 164 stores therein the programs executed by the CPU 150 and various data.

The communication device 166 is a communication interface configured of a communication device or the like for connecting to a communication network such as a public network or the Internet. The communication device 166 may also be a communication device supporting a wireless LAN (Local Area Network), a communication device supporting LTE (Long Term Evolution), or a wired communication device configured to perform communication in a wired manner.

2. Detailed Description of Embodiment of Present Disclosure

2-1. Configuration

Subsequently, a configuration according to the embodiment of the present disclosure will be described in detail. FIG. 5 is a functional block diagram illustrating the configuration of the information processing apparatus 10 according to the embodiment of the present disclosure. As illustrated in FIG. 5, the information processing apparatus 10 according to the embodiment of the present disclosure includes the control unit 100, the output unit 120, and the input unit 122. In addition, the control unit 100 includes a change-result candidate text specification unit 102, a change-result text selection unit 104, an output control unit 106, a correction-target-text selection unit 108, and a replacing-text determination unit 110.

2-1-1. Control Unit 100

The control unit 100 has a function of controlling operations of the information processing apparatus 10 as a whole by using the hardware such as the CPU 150 and the RAM 154 which are built in the information processing apparatus 10. For example, the control unit 100 controls operations of the output unit 120 and the input unit 122.

2-1-2. Change-Result-Candidate-Text Specification Unit 102

The change-result candidate text specification unit 102 specifies a plurality of change-result candidate texts for a correction target text selected from a text string, based on a first text located on one side of the correction target text. Here, the first text may be a text (hereinafter, also referred to as a preceding text) located at a position preceding the correction target text in the text string. Note that the text may be a word or a character string formed by combining two or more words together. When a text string language is, for example, Japanese or Chinese, the text may be a morpheme having undergone a morphological analysis performed by, for example, the change-result candidate text specification unit 102, or may be a character string formed by combining two or more morphemes together.

More specifically, the change-result candidate text specification unit 102 can use, for example, the candidate predicted-text presentation function to thereby specify a predetermined or smaller number of change-result candidate texts in descending order of an assessment value (hereinafter, also referred to as a score A) of coupling of each of the change-result candidate texts to the end of the preceding text. For example, FIG. 6 is an explanatory diagram illustrating a plurality of change-result texts specified based on the preceding text when the preceding text is "I don't". In an example in FIG. 6, the value of the score A is high in order of "eat" (7.0%), "walk" (5.0%), and "go" (3.0%), and thus the change-result candidate text specification unit 102 specifies the predetermined or smaller number of change-result candidate texts, such as 20 change-result candidate texts, in order of "eat", "walk", and "go".

Note that when the correction target text is the first word in the text string, the change-result candidate text specification unit 102 may consider that the preceding text has a NULL value, that is, that no preceding text exists, and may specify a plurality of change-result candidate texts. In this case, the change-result candidate text specification unit 102 may also specify the plurality of change-result candidate texts so that the change-result candidate texts can each match the first character or some characters included in the correction target text.

Note that each assessment value (score A) described above may be calculated, for example, by the change-result candidate text specification unit 102. Alternatively, the assessment value may be calculated after a preceding text is associated in advance with each of the plurality of change-result texts and then be recorded in a database. In addition, the information processing apparatus 10 can store the aforementioned database therein, or can also receive the assessment value from another apparatus having the database stored therein.

The change-result candidate text specification unit 102 can also specify, as a change-result candidate text, texts each partially being pronounced in the same manner as the correction target text. For example, when the correction target text is "hug", "have" the first character of which is pronounced in the same way may be specified as a change-result candidate text. One of advantageous effects is that, for example, when the correction target text is "hug", "eat" is not specified as a change-result candidate text. That is, it is possible to prevent a text having a considerably different pronunciation from that of the correction target text from being specified as a change-result candidate text.

Note that specifying a change-result candidate text is not limited to the example described above. The change-result candidate text specification unit 102 may specify, as a change-result candidate text, for example, a text uttered highly similarly with a correction target text as a whole, or may specify, as a change-result candidate text, a text uttered in a duration close to an duration of uttering a correction target text.

2-1-3. Change-Result-Text Selection Unit 104

The change-result text selection unit 104 selects some of a plurality of change-result candidate texts based on a second text located on the other side of the correction target text. Here, the second text may be a text located at a position succeeding the correction target text (hereinafter, also referred to as a succeeding text) in the text string.

More specifically, the change-result text selection unit 104 can select some of the plurality of change-result candidate texts, each based on an assessment value (hereinafter, also referred to as a score B) of coupling of the succeeding text to the end of each of the plurality of change-result candidate texts. For example, the change-result text selection unit 104 can select some of the plurality of change-result candidate texts based on the scores A and B, the score A being the assessment value of coupling of each of the plurality of change-result candidate texts to the end of the preceding text.

Note that when a word located at a position succeeding the correction target text is an article such as "a" or "the", the change-result text selection unit 104 may determine, as a succeeding text, a combination of the article and a noun succeeding the article, for example. When the correction target text is a word located at the end of one of sentences included in the text string, the change-result text selection unit 104 may determine a word located at the beginning of the next sentence, as a succeeding text.

Here, the function of selecting the aforementioned change-result candidate texts will be described in more detail with reference to FIG. 7. FIG. 7 is an explanatory diagram illustrating an example where the change-result text selection unit 104 selects change-result candidate texts in a case where a preceding text is "I don't" and where a succeeding text is "money".

For example, the change-result text selection unit 104 firstly generates a first candidate predicted-text 212 for each of a plurality of change-result candidate texts (specified by the change-result candidate text specification unit 102), by coupling the preceding text to each of the change-result candidate texts. Next, by using, for example, the candidate predicted-text presentation function, the change-result text selection unit 104 specifies a plurality of second candidate predicted-texts 214 which are texts each taking on a high assessment value (that is, the score B) of coupling of the corresponding text to the end of the first candidate predicted-text 212. Note that the change-result text selection unit 104 can also specify the second candidate predicted-texts 214: while the user is inputting the text string; or in the backend for an already inputted text string.

Next, the change-result text selection unit 104 extracts change-result candidate texts for which the succeeding text (that is, "money") is specified in the second candidate predicted-texts 214, from the plurality of change-result candidate texts. Then, the change-result text selection unit 104 selects some of the extracted change-result candidate texts, for example, in descending order of the score B.

In the example in FIG. 7, the value of the score B is high in order of "have" (4.0%), "want" (2.0%), and "save" (0.8%), and thus the change-result candidate text specification unit 102 may select the predetermined or smaller number of change-result candidate texts in order of "have", "want", and "save". According to the selection example, the change-result candidate texts are selected in consideration of the highness of the score B, and thus it is possible to select change-result candidates natural in a context.

Note that the assessment value (score B) described above may be calculated by, for example, the change-result text selection unit 104, or may be calculated after the first candidate predicted-text 212 is associated in advance with each of the plurality of second candidate predicted-texts 214 and then be recorded in a database. In addition, the information processing apparatus 10 can store the aforementioned database therein, or can also receive the assessment value from another apparatus having the database stored therein.

Also in a modification, the change-result text selection unit 104 can select some change-result candidate texts from the plurality of change-result candidate texts, based on the sum of: the assessment value (that is, the score A) of coupling of each of the plurality of change-result candidate texts to the end of the preceding text; and the assessment value (that is, the score B) of coupling of the succeeding text to the end of each of the plurality of change-result candidate texts. For example, in the example in FIG. 8, the sum of the score A and the score B is high in order of "have" (6.0%), "want" (3.0%), and "like" (1.35%), and thus the change-result candidate text specification unit 102 may select the predetermined or smaller number of change-result candidate texts in order of "have", "want", and "like".

The change-result text selection unit 104 can also select some of the plurality of change-result candidate texts based on the product of: the assessment value (that is, the score A) of coupling of each of the plurality of change-result candidate texts to the end of the preceding text; and the assessment value (that is, the score B) of coupling of the succeeding text to the end of each of the plurality of change-result candidate texts. For example, in an example in FIG. 8, the product of the score A and the score B is high in order of "have" (0.080%), "want" (0.020%), and "save" (0.004%), and thus the change-result candidate text specification unit 102 may select the predetermined or smaller number of change-result candidate texts in order of "have", "want", and "save".

According to these selection examples, the change-result candidate texts are selected in consideration of the highness of not only the score B but also the score A, and thus it is possible to select change-result candidates more natural in a context.

Note that the selection of the change-result candidate texts is not limited to the examples described above, and the change-result text selection unit 104 may select the change-result candidate texts based on a value of the sum or the product obtained by weighting the scores A and B based on a predetermined ratio such as 1:2 or 1:3. According to this selection example, it is possible to make the weighting of, for example, the score B higher than score A, thus making it possible to select the change-result candidate texts while further emphasizing collocation between each change-result candidate text and the succeeding text.

2-1-4. Output Control Unit 106

As illustrated, for example, in FIG. 9, the output control unit 106 can display, on the display screen 20, a display image for the user to select one of the change-result candidate texts which is to replace the correction target text, from among the change-result candidate texts selected by the change-result text selection unit 104. Note that the output control unit 106 may vary a display mode of the display image for each change-result candidate text in such a manner as to change a background color of the display image for the corresponding one of change-result candidate texts 220a, 220b, and 220c illustrated in FIG. 9. An advantageous effect of this example can be cited in which it is possible to cause the user to perceive each change-result candidate text in a more emphasized manner.

In addition, when the user selects one of the change-result candidate texts 220, such as "have", on the display screen 20 illustrated in, for example, FIG. 9, the output control unit 106 can replace the correction target text with the selected change-result candidate text 222 and display the replacing change-result candidate text 222 on the display screen 20 as illustrated in FIG. 10.

2-1-5. Correction-Target-Text Selection Unit 108

The correction-target-text selection unit 108 can extract a text highly probable to be inputted wrongly, from the text string. For example, the correction-target-text selection unit 108 verifies an input-error probability for each word in the text string from the top one by one, based on one or more words located at a position preceding the word for which the input-error probability is verified, and extracts a word highly probable to be inputted wrongly. In an example in FIG. 2, when the text string 30 is inputted into the information processing apparatus 10, the correction-target-text selection unit 108 can automatically extract "hug" as a text highly probable to be inputted wrongly.

Note that when the correction-target-text selection unit 108 extracts a text highly probable to be inputted wrongly, the output control unit 106 can display an extracted text 230 on the display screen 20 in such a manner as to vary a display mode of the extracted text 230 from the other texts, for example, as illustrated in FIG. 11. For example, the output control unit 106 displays the extracted text 230 on the display screen 20 in such a manner as to change a background color or a font type of the extracted text 230. An advantageous effect of the example can be cited in which visibility of a text highly probable to be inputted wrongly can be enhanced, and thus it is possible for the user to find a correction target text more quickly or to reduce correction failures.

The correction-target-text selection unit 108 can also select a correction target text from the text string based on utterance of the user. For example, in an example in FIG. 11, when the user utters "Select 'hug'!", the correction-target-text selection unit 108 may perform speech recognition on the utterance of the user and may then select "hug" as a correction target text. According to this modification, for example, when the information processing apparatus 10 is located slightly away from the user, the user can select the correction target text without touching the display screen 20. This modification is useful particularly when the information processing apparatus 10 is a TV receiver.

2-1-6. Replacing-Text Determination Unit 110

The replacing-text determination unit 110 determines a change-result candidate text which is to replace the correction target text from the change-result candidate texts selected by the change-result text selection unit 104, based on the utterance of the user or tapping the display screen 20. For example, in an example in FIG. 9, when the user utters "Replace 'have'!", the replacing-text determination unit 110 may perform the speech recognition on the utterance of the user and may then determine "have" as the change-result candidate text which is to replace "hug", that is, the correction target text. An advantageous effect of this example is cited in which the user can correct the text string without touching the display screen 20.

2-1-7. Output Unit 120

The output unit 120, for example, displays the display screen 20 or outputs sound in accordance with an instruction from the output control unit 106.

2-1-8. Input Unit 122

The input unit 122 receives various inputs from the user. For example, the input unit 122 receives a touch operation of the display screen 20 performed by the user and utterance of the user.

Note that according to the embodiment of the present disclosure, it is also possible to provide a computer program for causing the hardware such as the CPU 150, the ROM 152, and the RAM 154 which are built in the information processing apparatus 10 to exert functions equivalent to those in the components of the information processing apparatus 10. There is also provided a storage medium having the computer program stored therein.

In addition, the configuration according to the embodiment of the present disclosure is not limited to the configuration described above. For example, one or more of the output unit 120 and the input unit 122 do not have to be included in the information processing apparatus 10 and thus may be included in another apparatus.

2-2. Operation

The configuration according to the embodiment of the present disclosure has heretofore been described. Subsequently, an operation according to the embodiment of the present disclosure will be described. FIG. 12 is a flowchart illustrating part of an example of an operation according to the embodiment of the present disclosure.

As illustrated in FIG. 12, the input unit 122 firstly receives input of a text string from the user. Then, the output control unit 106 displays the inputted text string on the display screen 20 (S101).

Subsequently, the correction-target-text selection unit 108 accepts the selection of a correction target text by the user, for example, based on utterance of the user, tapping the display screen 20, or the like (S102). Alternatively, the correction-target-text selection unit 108 can also automatically extract a text highly probable to be inputted wrongly, from the inputted text string.

Subsequently, the change-result candidate text specification unit 102 specifies a plurality of change-result candidate texts for the selected correction target text, based on a preceding text located at a position preceding the correction target text (S103).

Subsequently, the change-result text selection unit 104 calculates an assessment value (score A) of coupling of each of the plurality of change-result candidate texts to the end of the preceding text (S104). Note that as described above, the change-result text selection unit 104 may acquire the assessment value (score A) from a database stored in the information processing apparatus 10 or in another apparatus.

Subsequently, the change-result text selection unit 104 calculates an assessment value (score B) of coupling of a succeeding text located at a position succeeding the correction target text to the end of each of the plurality of change-result candidate texts (S105). Note that as described above, the change-result text selection unit 104 may acquire the assessment value (score B) from the database stored in the information processing apparatus 10 or in another apparatus.

Next, an operation subsequent to S105 will be described with reference to FIG. 13. As illustrated in FIG. 13, after S105, the change-result text selection unit 104 selects some of the plurality of change-result candidate texts specified by the change-result candidate text specification unit 102, based on the values of assessments calculated in S104 and S105 (S111).

Subsequently, the output control unit 106 displays, on the display screen 20, a display image for the user to select a change-result candidate text which is to replace the correction target text (S112).

Subsequently, the replacing-text determination unit 110 determines the change-result candidate text which is to replace the correction target text from the change-result candidate texts selected by the change-result text selection unit 104, based on, for example, utterance of the user or tapping the display screen 20 (S113).

Subsequently, the output control unit 106 displays the selected change-result candidate text replacing the correction target text on the display screen 20 (S114). Thereafter, the information processing apparatus 10 repeats the operation in S102.

2-3. Advantageous Effects

As has been described above with reference to, for example, FIGS. 5, 7, 12, and 13, and the like, the information processing apparatus 10 according to the embodiment of the present disclosure specifies a plurality of change-result candidate texts for a correction target text selected from a text string, based on a preceding text located at a position preceding the correction target text. Then, the information processing apparatus 10 selects some of the plurality of change-result candidate texts, based on the succeeding text located at a position succeeding the correction target text. Thus, the information processing apparatus 10 can present desirable corrected-text candidates in consideration of collocation with the succeeding text, and thus the user can correct the text string efficiently.

For example, the information processing apparatus 10 can select such a candidate corrected-text that is grammatically correct and natural in a context in the text string, and thus is highly likely to present corrected-text candidates desired by the user. In addition, the user can select a desired candidate from selected change-result candidate texts, based on utterance of the user or tapping the display screen 20. This eliminates, for example, the necessity of once deleting a correction target text from the text string and thereafter inputting a new text, and thus it is possible to improve the correction speed.

In addition, the information processing apparatus 10 selects some of the plurality of change-result candidate texts, each based on the assessment value of coupling of each of the plurality of change-result candidate texts to the end of the preceding text and the assessment value of coupling of the succeeding text to the end of each of the plurality of change-result candidate texts. This causes the information processing apparatus 10 to select the change-result candidate texts in consideration of collocation with both each of the preceding text and the succeeding text, and thus it is possible to select such change-result candidate texts that are more natural in a context.

In addition, the information processing apparatus 10 extracts, from the text string, a text highly probable to be inputted wrongly, and displays the extracted text on the display screen 20 in such a manner as to vary the display mode of the extracted text from a mode of the other texts. This can enhance the visibility of the text highly probable to be inputted wrongly, and thus it is possible for the user to find a correction target text more quickly and to further increase the text correction speed.

3. Modifications

It should be understood by those skilled in the art that various modifications, combinations, sub-combinations and alterations may occur depending on design requirements and other factors insofar as they are within the scope of the appended claims or the equivalents thereof.

3-1. Modification 1

For example, the change-result candidate text specification unit 102 can further specify a plurality of second change-result candidate texts to each of which a correction target text is changeable, based on the grammar type selected by the user. In addition, the output control unit 106 can further display the plurality of second change-result candidate texts on the display screen 20.

Here, the aforementioned functions will be described in more detail with reference to FIGS. 15 to 18. FIGS. 15 to 18 are explanatory diagrams each illustrating a display example of the display screen 20 according to the present modification. Note that FIGS. 15 to 18 each illustrate the display example in a case where a text string 30a illustrated in FIG. 14 is wrongly inputted in the information processing apparatus 10.

As illustrated in FIG. 15, when the user selects an Inflect tab 300b on the display screen 20, the change-result candidate text specification unit 102 can specify, as second change-result candidate texts, a plurality of texts obtained by inflecting the correction target text. In an example in FIG. 15, when the correction target text is "young", the change-result candidate text specification unit 102 specifies "younger" and "youngest" which are the comparative degree and the superlative degree of the correction target text, respectively, as the second change-result candidate texts. According to this specification example, for example, when the speech recognition function wrongly recognizes the ending of a word, the user can correct the text efficiently.

In addition, as illustrated in FIG. 16, when the user selects a Singular-plural tab 300c on the display screen 20, the change-result candidate text specification unit 102 can specify, as a second change-result candidate text, a text obtained by changing a form of the correction target text from the singular form to the plural form, or from the plural form to the singular form. In an example in FIG. 16, when the correction target text is "son", the change-result candidate text specification unit 102 specifies "sons" as the second change-result candidate text. According to this specification example, for example, when the speech recognition function wrongly recognizes the ending of a word, the user can correct the text efficiently.

Moreover, as illustrated in FIG. 17, when the user selects a Combine-divide tab 300d on the display screen 20, the change-result candidate text specification unit 102 can specify a second change-result candidate text while one word forming a correction target text is divided into two or more words, or while two or more words forming a correction target text is combined into one word. In an example in FIG. 17, when the correction target text is "everyday", the change-result candidate text specification unit 102 specifies "every day" as a second change-result candidate text. According to this specification example, for example, when the speech recognition function does not recognize articulation of words appropriately, the user can correct the text efficiently.

Further, as illustrated in FIG. 18, when the user selects an Insert "." tab 300e on the display screen 20, the change-result candidate text specification unit 102 specifies, as a second change-result candidate text, a text obtained by inserting "." or "," at a position succeeding the correction target text based on the correction target text or the succeeding text. For example, the change-result candidate text specification unit 102 may specify, as the second change-result candidate text, a text obtained by inserting "." between the correction target text and the succeeding text and by changing the case of the first letter of the succeeding text to an upper case. Alternatively, the change-result candidate text specification unit 102 may specify, as a second change-result candidate text, a text obtained by inserting "," between the correction target text and the succeeding text. In an example in FIG. 18, when the correction target text is "sons", and when the succeeding text is "the", the change-result candidate text specification unit 102 specifies "sons. The" and "sons, the" as second change-result candidate texts. According to this specification example, for example, when the speech recognition function does not recognize articulation of sentences appropriately, the user can correct the text efficiently.

Note that the specification examples of the second change-result candidate texts are not limited to the aforementioned examples. For example, the change-result candidate text specification unit 102 may specify, as a second change-result candidate text, a text obtained by changing a part of speech of a correction target text.

In addition, in the display examples in FIGS. 15 to 18, when the user selects an Ordinary tab 300a, the output control unit 106 may display, on the display screen 20, change-result candidate texts selected by the change-result text selection unit 104.

3-2. Modification 2

The description has been given of the example where the information processing apparatus 10 includes components included in the control unit 100 such as the change-result candidate text specification unit 102 and the change-result text selection unit 104 according to the embodiment of the present disclosure, but the embodiment of the present disclosure is not limited to the example. Instead of being provided to the information processing apparatus 10, the components included in the control unit 100 described above may be provided to a communication device capable of communicating with the information processing apparatus 10, such as a server device. Moreover, instead of being stored in the information processing apparatus 10, a computer program for causing the components included in the control unit 100 described above to exert functions equivalent to those in the components may be stored in the communication device.

Additionally, the present technology may also be configured as below.

(1) An information processing apparatus including:
a control device to determine a plurality of candidate texts to correct a target text which is from an input text string, based on preceding text located at a position preceding the target text and succeeding text located at a position succeeding the target text.

(2) The apparatus according to (1),
wherein the input text string is determined using speech recognition.

(3) The apparatus according to (1) or (2),
wherein the candidate texts are determined from second candidate texts specified based on the preceding text.

(4) The apparatus according to any one of (1) to (3),
wherein the candidate texts are determined by coupling of the succeeding text to an end of each of the second candidate texts.

(5) The apparatus according to any one of (1) to (4),
wherein the control device is to calculate an assessment value of the coupling of the succeeding text to the end of each of the second candidate texts.

(6) The apparatus according to any one of (1) to (5),
wherein the candidate texts are determined based on the assessment values.

(7) The apparatus according to any one of (1) to (6),
wherein the candidate texts are determined based on some of the assessment values.

(8) The apparatus according to any one of (1) to (7),
wherein the candidate texts are determined based on a product of an assessment value of second candidate texts specified based on the preceding text and a second assessment value of coupling of the succeeding text to an end of each of the second candidate texts.

(9) The apparatus according to any one of (1) to (8),
wherein the candidate texts are determined based on pronunciation in relation to the target text.

(10) The apparatus according to any one of (1) to (9),
wherein the apparatus is in an eye-glass device.

(11) The apparatus according to any one of (1) to (10),
wherein the candidate texts are determined solely by operation of the control device.

(12) An information processing method including:
determining, by a control device, a plurality of candidate texts to correct a target text which is from an input text string, based on preceding text located at a position preceding the target text and succeeding text located at a position succeeding the target text.

(13) A non-transitory recording medium recorded with a program executable by a computer, the program including:
determining a plurality of candidate texts to correct a target text which is from an input text string, based on preceding text located at a position preceding the target text and succeeding text located at a position succeeding the target text.

(14) An information processing system including:
at least two devices having communication capability of: an eye-glass device, a mobile phone device, and a server device; and
a control device including a plurality of components, in which at least one of the components is included in each of the at least two devices, wherein the components in the at least two devices are operable to jointly determine a plurality of candidate texts to correct a target text which is from an input text string, based on preceding text located at a position preceding the target text and succeeding text located at a position succeeding the target text.

(15)
An information processing apparatus including:
a change-result candidate text specification unit that specifies a plurality of change-result candidate texts for a correction target text selected from a text string, based on a first text located on one side of the correction target text; and
a change-result text selection unit that selects part of the plurality of change-result candidate texts based on a second text located on the other side of the correction target text.

(16)
The information processing apparatus according to (15),
wherein the first text is located at a position preceding the correction target text in the text string, and
wherein the second text is located at a position succeeding the correction target text in the text string.

(17)
The information processing apparatus according to (16),
wherein the change-result text selection unit selects the part of the plurality of change-result candidate texts based on an assessment value of coupling of the second text to an end of each of the plurality of change-result candidate texts.

(18)
The information processing apparatus according to (17),
wherein the change-result candidate text specification unit specifies a predetermined or smaller number of change-result candidate texts in descending order of an assessment value of coupling to an end of the first text.

(19)
The information processing apparatus according to (17) or (18),
wherein the change-result text selection unit further selects part of the plurality of change-result candidate texts based on an assessment value of coupling of each of the plurality of change-result candidate texts to an end of the first text.

(20)
The information processing apparatus according to (19), wherein the change-result text selection unit selects part of the plurality of change-result candidate texts based on a sum of the assessment value of coupling of each of the plurality of change-result candidate texts to the end of the first text and the assessment value of coupling of the second text to the end of each of the plurality of change-result candidate texts.

(21)
The information processing apparatus according to (19), wherein the change-result text selection unit selects part of the plurality of change-result candidate texts based on a product of the assessment value of coupling of each of the plurality of change-result candidate texts to the end of the first text and the assessment value of coupling of the second text to the end of each of the plurality of change-result candidate texts.

(22)
The information processing apparatus according to any one of (15) to (21), wherein the change-result candidate text specification unit specifies, as the change-result candidate texts, texts each partially pronounced in a same way as the correction target text.

(23)
The information processing apparatus according to any one of (15) to (22), further including
an output control unit that displays, on a display screen, display for causing a user to select one of the change-result candidate texts selected by the change-result text selection unit, the one of the change-result candidate texts being to replace the correction target text.

(24)
The information processing apparatus according to (23), wherein based on a grammar type selected by the user, the change-result candidate text specification unit further specifies a plurality of second change-result candidate texts to each of which the correction target text is changeable, and wherein the output control unit further displays the plurality of second change-result candidate texts on the display screen.

(25)
The information processing apparatus according to (23) or (24), further including
a correction-target-text selection unit that extracts a text highly probable to be inputted wrongly, from the text string, wherein the output control unit displays the text extracted by the correction-target-text selection unit on the display screen while varying a display mode of the text from a display mode of texts other than the extracted text.

(26)
The information processing apparatus according to any one of (15) to (24), further including:
a correction-target-text selection unit that selects the correction target text from the text string based on utterance of a user; and
a replacing-text determination unit that determines one of the change-result candidate texts selected by the change-result text selection unit, based on utterance of the user, the one of the change-result candidate texts being to replace the correction target text.

(27)
The information processing apparatus according to any one of (15) to (26), wherein the text is a word.

(28)
An information processing method including:
specifying a plurality of change-result candidate texts for a correction target text selected from a text string, based on a first text located on one side of the correction target text; and
selecting part of the plurality of change-result candidate texts based on a second text located on the other side of the correction target text.

(29)
A program for causing a computer to function as:
a change-result candidate text specification unit that specifies a plurality of change-result candidate texts for a correction target text selected from a text string, based on a first text located on one side of the correction target text; and
a change-result text selection unit that selects part of the plurality of change-result candidate texts based on a second text located on the other side of the correction target text.

REFERENCE SIGNS LIST

10 information processing apparatus
100 control unit
102 change-result candidate text specification unit
104 change-result text selection unit
106 output control unit
108 correction-target-text selection unit
110 replacing-text determination unit
120 output unit
122 input unit
150 CPU
152 ROM
154 RAM
156 internal bus
158 interface
160 input device
162 output device
164 storage device
166 communication device

The invention claimed is:

1. An information processing apparatus comprising:
an input device that receives speech and determines an input text string from the speech by a speech recognition function;
an output device that displays the input text string; and
a control device that determines a plurality of candidate texts to correct a target text which is from the input text string, based on a number value stored in an electronic memory and associated with preceding text located at a position preceding the target text, a number value stored in an electronic memory and associated with succeeding text located at a position succeeding the target text, and a weighting of the number value associated with the preceding text and the number value associated with the succeeding text based on a predetermined ratio, the weighting performed by using a processor to arithmetically apply the predetermined ratio to the number value associated with the preceding text and the number value associated with the succeeding text, such that in determining the plurality of candidate texts one of the value associated with preceding text and the value associated with succeeding text is given greater weight than the other one of the value associated with preceding text and the value associated with succeeding text, wherein the output device displays an image for use in selecting among the candidate texts.

2. The apparatus of claim 1, wherein the candidate texts are determined from second candidate texts specified based on the preceding text.

3. The apparatus of claim 1, wherein the candidate texts are determined by coupling of the succeeding text to an end of each of the second candidate texts.

4. The apparatus of claim 3, wherein the control device is to calculate an assessment value of the coupling of the succeeding text to the end of each of the second candidate texts.

5. The apparatus of claim 4, wherein the candidate texts are determined based on the assessment values.

6. The apparatus of claim 5, wherein the candidate texts are determined based on some of the assessment values.

7. The apparatus of claim 1, wherein the candidate texts are determined based on a product of an assessment value of second candidate texts specified based on the preceding text and a second assessment value of coupling of the succeeding text to an end of each of the second candidate texts.

8. The apparatus of claim 1, wherein the candidate texts are determined based on pronunciation in relation to the target text.

9. The apparatus of claim 1, wherein the apparatus is in an eye-glass device.

10. The apparatus of claim 9, wherein the candidate texts are determined solely by operation of the control device.

11. An information processing method comprising:

receiving speech by an input device and determining an input text string from the speech by a speech recognition function;

displaying the input text string by an output device;

determining, by a control device, a plurality of candidate texts to correct a target text which is from the input text string, based on a number value stored in an electronic memory and associated with preceding text located at a position preceding the target text, a number value stored in an electronic memory and associated with succeeding text located at a position succeeding the target text, and a weighting of the number value associated with the preceding text and the number value associated with the succeeding text based on a predetermined ratio, the weighting performed by using a processor to arithmetically apply the predetermined ratio to the number value associated with the preceding text and the number value associated with the succeeding text, such that in determining the plurality of candidate texts one of the value associated with preceding text and the value associated with succeeding text is given greater weight than the other one of the value associated with preceding text and the value associated with succeeding text; and displaying an image by the output device for use in selecting among the candidate texts.

12. A non-transitory recording medium recorded with a program executable by a computer, the program comprising:

receiving speech by an input device and determining an input text string from the speech by a speech recognition function;

displaying the input text string by an output device;

determining a plurality of candidate texts to correct a target text which is from the input text string, based on a number value stored in an electronic memory and associated with preceding text located at a position preceding the target text, a number value stored in an electronic memory and associated with succeeding text located at a position succeeding the target text, and a weighting of the number value associated with the preceding text and the number value associated with the succeeding text based on a predetermined ratio, the weighting performed by using a processor to arithmetically apply the predetermined ratio to the number value associated with the preceding text and the number value associated with the succeeding text, such that in determining the plurality of candidate texts one of the value associated with preceding text and the value associated with succeeding text is given greater weight than the other one of the value associated with preceding text and the value associated with succeeding text; and displaying an image by the output device for use in selecting among the candidate texts.

13. An information processing system comprising:

an input device that receives speech and determines an input text string from the speech by a speech recognition function;

an output device that displays the input text string;

at least two devices having communication capability of:

an eye-glass device, a mobile phone device, and a server device; and a control device including a plurality of components, in which at least one of the components is included in each of the at least two devices, wherein the components in the at least two devices determine a plurality of candidate texts to correct a target text which is from the input text string, based on a number value stored in an electronic memory and associated with preceding text located at a position preceding the target text, a number value stored in an electronic memory and associated with succeeding text located at a position succeeding the target text, and a weighting of the number value associated with the preceding text and the number value associated with the succeeding text based on a predetermined ratio, the weighting performed by using a processor to arithmetically apply the predetermined ratio to the number value associated with the preceding text and the number value associated with the succeeding text, such that in determining the plurality of candidate texts one of the value associated with preceding text and the value associated with succeeding text is given greater weight than the other one of the value associated with preceding text and the value associated with succeeding text, wherein the output device displays an image for use in selecting among the candidate texts.

* * * * *